(12) United States Patent
Velev et al.

(10) Patent No.: US 11,306,214 B2
(45) Date of Patent: Apr. 19, 2022

(54) FRACTAL-LIKE POLYMERIC PARTICLES AND THEIR USE IN DIVERSE APPLICATIONS

(71) Applicant: North Carolina State University, Raleigh, NC (US)

(72) Inventors: Orlin D. Velev, Raleigh, NC (US); Sangchul Roh, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 660 days.

(21) Appl. No.: 16/099,670

(22) PCT Filed: May 9, 2017

(86) PCT No.: PCT/US2017/031786
§ 371 (c)(1),
(2) Date: Nov. 7, 2018

(87) PCT Pub. No.: WO2017/196864
PCT Pub. Date: Nov. 16, 2017

(65) Prior Publication Data
US 2019/0153247 A1    May 23, 2019

Related U.S. Application Data

(60) Provisional application No. 62/333,618, filed on May 9, 2016.

(51) Int. Cl.
*C09D 7/40* (2018.01)
*C08K 7/02* (2006.01)
(Continued)

(52) U.S. Cl.
CPC ............... *C09D 7/70* (2018.01); *C08K 7/02* (2013.01); *C09D 5/00* (2013.01); *C09D 7/65* (2018.01);
(Continued)

(58) Field of Classification Search
CPC ...... C08G 83/003; C08G 69/00; C08G 81/00; C08K 7/02; C08L 101/005; B82B 3/00;
(Continued)

(56) References Cited

U.S. PATENT DOCUMENTS 2,342,387 A    12/1944    Catlin
2,810,646 A    10/1957    Wooding et al.
(Continued)

FOREIGN PATENT DOCUMENTS

JP    2008002037    *  1/2008
WO   2015/112894 A1    7/2015
WO   2016059617 A1    4/2016

OTHER PUBLICATIONS

European Patent Office Partial Supplementary Search Report for Application No. 17796700.7 dated Jan. 2, 2020 (14 pages).
(Continued)

*Primary Examiner* — Camie S Thompson
(74) *Attorney, Agent, or Firm* — Olive Law Group, PLLC; Nathan P. Letts

(57) ABSTRACT

Fractal-like polymeric particles having a hierarchical, branched structure are disclosed. The particles have fibers with nanometer-scale diameters on their peripheries, which enables a number of unique and highly desirable properties. The particles are fabricated by a method combining phase separation and shear forces of different solutions, in particular a polymer solution. In addition, the particles may be used as coatings, nonwovens, textiles and viscosity modifiers and adhesives, among other applications.

26 Claims, 32 Drawing Sheets

(51) Int. Cl.
| | |
|---|---|
| *C09D 7/65* | (2018.01) |
| *C09D 5/00* | (2006.01) |
| *C09D 101/12* | (2006.01) |
| *C09D 101/28* | (2006.01) |
| *C09D 125/06* | (2006.01) |
| *C09D 129/04* | (2006.01) |
| *C09D 181/06* | (2006.01) |
| *C09K 3/00* | (2006.01) |

(52) U.S. Cl.
CPC ......... *C09D 101/12* (2013.01); *C09D 101/28* (2013.01); *C09D 125/06* (2013.01); *C09D 129/04* (2013.01); *C09D 181/06* (2013.01); *C09K 3/00* (2013.01)

(58) Field of Classification Search
CPC ........... Y10S 977/754; Y10T 428/2913; Y10T 428/2973; Y10T 428/2933; Y10T 428/23957; Y10T 442/698; C09J 175/04; C08J 3/12; B82Y 30/00; B29C 48/05; B29C 48/021; D01D 5/40; D01D 5/00; B01J 20/208007; B01J 20/28023; B01J 20/28057
USPC ............... 428/375, 92, 364, 323; 528/502 F; 117/87; 264/255
See application file for complete search history.

(56) References Cited

U.S. PATENT DOCUMENTS

| | | | |
|---|---|---|---|
| 2,988,782 | A | 6/1961 | Guandique et al. |
| 2,999,788 | A | 9/1961 | Morgan |
| 3,018,091 | A | 1/1962 | Duggins |
| 3,114,672 | A | 12/1963 | Schott |
| 3,342,921 | A | 9/1967 | Brundige et al. |
| 3,431,242 | A | 3/1969 | Waters et al. |
| 3,743,272 | A | 7/1973 | Nowotny et al. |
| 3,902,957 | A | 9/1975 | Kozlowski |
| 3,997,648 | A | 12/1976 | Davis et al. |
| 4,013,751 | A | 3/1977 | Davis et al. |
| 4,091,058 | A | 5/1978 | Sander et al. |
| 4,219,512 | A | 8/1980 | Sinn et al. |
| 4,224,259 | A | 9/1980 | Sander et al. |
| 4,374,788 | A | 2/1983 | Gonzales |
| 4,519,873 | A | 5/1985 | Amano et al. |
| 5,209,877 | A | 5/1993 | Frances et al. |
| 5,695,695 | A | 12/1997 | Steinau et al. |
| 6,143,211 | A | 11/2000 | Mathiowitz et al. |
| 6,184,373 | B1 | 2/2001 | Bernard et al. |
| 7,323,540 | B2 | 1/2008 | Velev et al. |
| 8,137,751 | B2 | 3/2012 | Bhushan et al. |
| 8,551,378 | B2 | 10/2013 | Velev et al. |
| 8,877,072 | B2 | 11/2014 | Sahai et al. |
| 8,940,362 | B2 | 1/2015 | Massa et al. |
| 9,120,953 | B2 | 9/2015 | Sitti et al. |
| 9,217,210 | B2 | 12/2015 | Velev et al. |
| 9,217,211 | B2 | 12/2015 | Velev et al. |
| 2006/0225162 | A1 | 10/2006 | Yi |
| 2013/0012598 | A1 | 1/2013 | Velev et al. |
| 2016/0038384 | A1 | 2/2016 | Maitra et al. |

OTHER PUBLICATIONS

Alargova et al., "Foam Superstabilization by Polymer Microrods," Langmuir, 2004, 20, 10371-10374.
Alargova et al., "Formation of Polymer Microrods in Shear Flow by Emulsification—Solvent Attrition Mechanism," Langmuir, 2006, 22, 765-774.
Alargova et al., "Scalable Synthesis of New Class of Polymer Microrods by A Liquid-liquid Dispersion Technique," Adv. Mater., 2004, 16, 1653-1657.
Arzt et al., "From Micro to Nano Contacts in Biological Attachment Devices," Proc. Natl. Acad. Sci. U. S. A., 2003, 100, 10603-10606.
Burrough, "Fractal dimensions of landscapes and other environmental data," Nature, 1981, 294, 240-242.
Cordier et al., "Self-healing and thermoreversible rubber from supramolecular assembly," Nature, 2008, 451, 977-980.
Feng et al., "Super Hydrophobic Surfaces: from Natural to Artificial," Adv. Mater., 2002, 14, 1857-1860.
Gao et al., "Facile preparation of hierarchically porous polymer microspheres for superhydrophobic coating," Nanoscale, 2014, 6, 1056-1063.
Greiner et al., "Adhesion of Bioinspired Micropatterned Surfaces: Effects of Pillar Radius, Aspect Ratio, and Preload," Langmuir, 2007, 23, 3495-3502.
Guillen et al., "Preparation and Characterization of Membranes Formed by Nonsolvent Induced Phase Separation: A Review," Ind. Eng. Chem. Res., 2011, 50, 3798-3817.
International Search Report and Written Opinion for Application No. PCT/US2017/031786 dated Sep. 28, 2017 (11 pages).
Jin et al., "Joining the Un-Joinable: Adhesion Between Low Surface Energy Polymers Using Tetrapodal ZnO Linkers," Adv. Mater., 2012, 24, 5676-5680.
Kamperman et al., "Functional Adhesive Surfaces with "Gecko" Effect: The Concept of Contact Splitting," Adv. Eng. Mater., 2010, 12, 335-348.
Kwak et al., "Towards the Next Level of Bioinspired Dry Adhesives: New Designs and Applications," Adv. Funct. Mater, 2011, 21, 3606-3616.
Li et al., "What do we need for a superhydrophobic surface? A review on the recent progress in the preparation of superhydrophobic surfaces," Chem. Soc. Rev., 2007, 36, 1350-1368.
Nosonovsky et al., "Superhydrophobic Surfaces and Emerging Applications: Non-adhesion, Energy, Green Engineering," Curr. Opin. Colloid Interface Sci., 2009, 14, 270-280.
Onda et al., "Super-Water-Repellent Fractal Surfaces," Langmuir, 1996, 12, 2125-2129.
Prevo et al., "Controlled Rapid Deposition of Structured Coatings from Micro-and Nanoparticle Suspensions," Langmuir, 2004, 20, 2099-2107.
Raghavan et al., "Shear-Thickening Response of Fumed Silica Suspensions under Steady and Oscillatory Shear," J. Colloid Interface Sci., 1997, 185, 57-67.
Rezabeigi et al., "Production of porous polylactic acid monoliths via nonsolvent induced phase separation," Polymer (Guildf), 2014, 55, 6743-6753.
S.T. et al., "Properties of phase separation method synthesized superhydrophobic polystyrene films," Applied Surface Science, 2012, 258, 3202-3207.
Smoukov et al., "Scalable Liquid Shear-Driven Fabrication of Polymer Nanofibers," Adv. Mater., 2015, 1-6.
Tsujii et al., "Super Oil-Repellent Surfaces," Angew. Chemie Int. Ed. English, 1997, 36, 1011-1012.
Varenberg et al., "Geometry-Controlled Adhesion: Revisiting the Contact Splitting Hypothesis," Appl. Phys. A—Mater., 2011, 103, 933-938.
Wege et al., "Long-Term Stabilization of Foams and Emulsions with In-Situ Formed Microparticles from Hydrophobic Cellulose," Langmuir, 2008, 24, 9245-9253.
European Patent Office Extended Search Report for Application No. 17796700.7 dated Nov. 20, 2020 (13 pages).
Extended European Search Report dated Dec. 16, 2021 [sic] for associated European Application No. 21185173.8-1102 (6 pages).

\* cited by examiner a) Extrinsic contribution to the work of adhesion b) Adaptability to rough surfaces c) Size effect due to surface-to-volume ratio d) Uniform stress distribution e) Defect control and adhesion redundancy

FRACTAL-LIKE POLYMERIC PARTICLES AND THEIR USE IN DIVERSE APPLICATIONS

CROSS-REFERENCE TO RELATED APPLICATION

This present patent application is a national stage filing under 35 U.S.C. § 371 of International Application No. PCT/US2017/031786, filed on May 9, 2017, which claims priority to U.S. Provisional Application No. 62/333,618 filed on May 9, 2016, the content of which are incorporated fully herein by reference in their entirety.

TECHNICAL FIELD

The present disclosure relates generally to fractal-like polymeric particles having a hierarchical structure of branched fibers, where their thinnest portion extending on the outside can be on the nanoscale. In addition, the present disclosure relates generally to methods of making the particles and uses of the particles.

BACKGROUND

Fractal is a mathematical concept which is directed to self-similarity on multiple scales, and the use of the "fractal" concept has contributed to the development of various functional materials, since fractal-like surfaces have a very large surface area with high roughness and porosity. Fractal-like structured materials may be effectively applicable as thickening agents and superhydrophobic surfaces. For instance, the addition of a small amount of fumed silica, which has a fractal-like structure, can make suspensions notably thick. This is due to the effective phase volume fraction of the fractal silica being much higher than their actual volume, because porous silica clusters occupy a very large volume of space. Additionally, fractal-like structures with low surface energy may be used to fabricate superhydrophobic surfaces.

Microscale fractal-like structures may be formed via "bottom-up" processes, by which small particles or supramolecules are aggregated or assembled into branched structures. For example, fumed silica is assembled by hydrogen bonding among the particles. In addition, molecularly branched dendrimeric polymer molecules are known within the art. However, fractal-like supra-molecular structures driven by a top-down polymer liquid precipitation approach has not been reported. Furthermore, fractal-like polymer particles provided by liquid precipitation, in a "top-approach" may have unique advantages and properties in numerous applications compared to "bottom-up" (e.g., fumed silica) approaches.

SUMMARY

In some aspects, the present disclosure provides particles comprising an aggregate of polymer molecules, and having a branched fibrous structure that includes at least a first portion, a second portion and a third portion, each portion individually having a plurality of fibers wherein the first portion comprises a first plurality of fibers having diameters of from about 10 times to about 100 times larger than the fiber diameters of the third portion, wherein the surface area of the first portion constitutes from about 10% to about 40% of the surface area of the particle; the second portion comprises a second plurality of fibers extending from the first portion having diameters of from about 5 times to about 10 times larger than the fiber diameters of the third portion, wherein the surface area of the second portion constitutes from about 20% to about 50% of the surface area of the particle; and the third portion comprises a third plurality of fibers extending from the second portion having diameters of from about 20 nm to about 500 nm, wherein the surface area of the third portion constitutes from about 10% to about 70% of the surface area of the particle.

In some aspects, the present disclosure provides particles comprising an aggregate of polymer molecules, and having a branched fibrous structure that includes at least a first portion, a second portion and a third portion, each portion individually having a plurality of fibers wherein the first portion comprises a first plurality of fibers having diameters from about 2 µm to about 10 µm, wherein the surface area of the first portion constitutes from about 10% to about 40% of the surface area of the particle; the second portion comprises a second plurality of fibers extending from the first portion and having diameters from about 0.5 µm to about 2 µm, wherein the surface area of the second portion constitutes from about 20% to about 50% of the surface area of the particle; and the third portion comprises a third plurality of fibers extending from the second portion and having diameters less than about 0.5 µm, wherein the surface area of the third portion constitutes from about 10% to about 70% of the surface area of the particle.

In some aspects, the present disclosure provides methods of fabricating the particles. The method comprises: flowing a dispersion medium through a high shear mixer; introducing a precursor solution into the dispersion medium to form a dispersion system comprising the dispersion medium and a plurality of dispersed-phase components of the precursor solution, wherein the precursor solution comprises a polymer dissolved in a polymer solvent at a concentration of from about 3% to about 10% by weight, and the dispersion medium comprises an anti-solvent; and shearing the dispersed-phase components by flowing the dispersion system through the high shear mixer, wherein the dispersion system has a Reynolds number of about 3,000 or higher, whereupon the particle is formed in the dispersion medium.

In some aspects, the present disclosure provides uses of the particles.

Other aspects of the invention will become apparent by consideration of the detailed description and accompanying drawings.

DETAILED DESCRIPTION

Definitions

Figure 1:
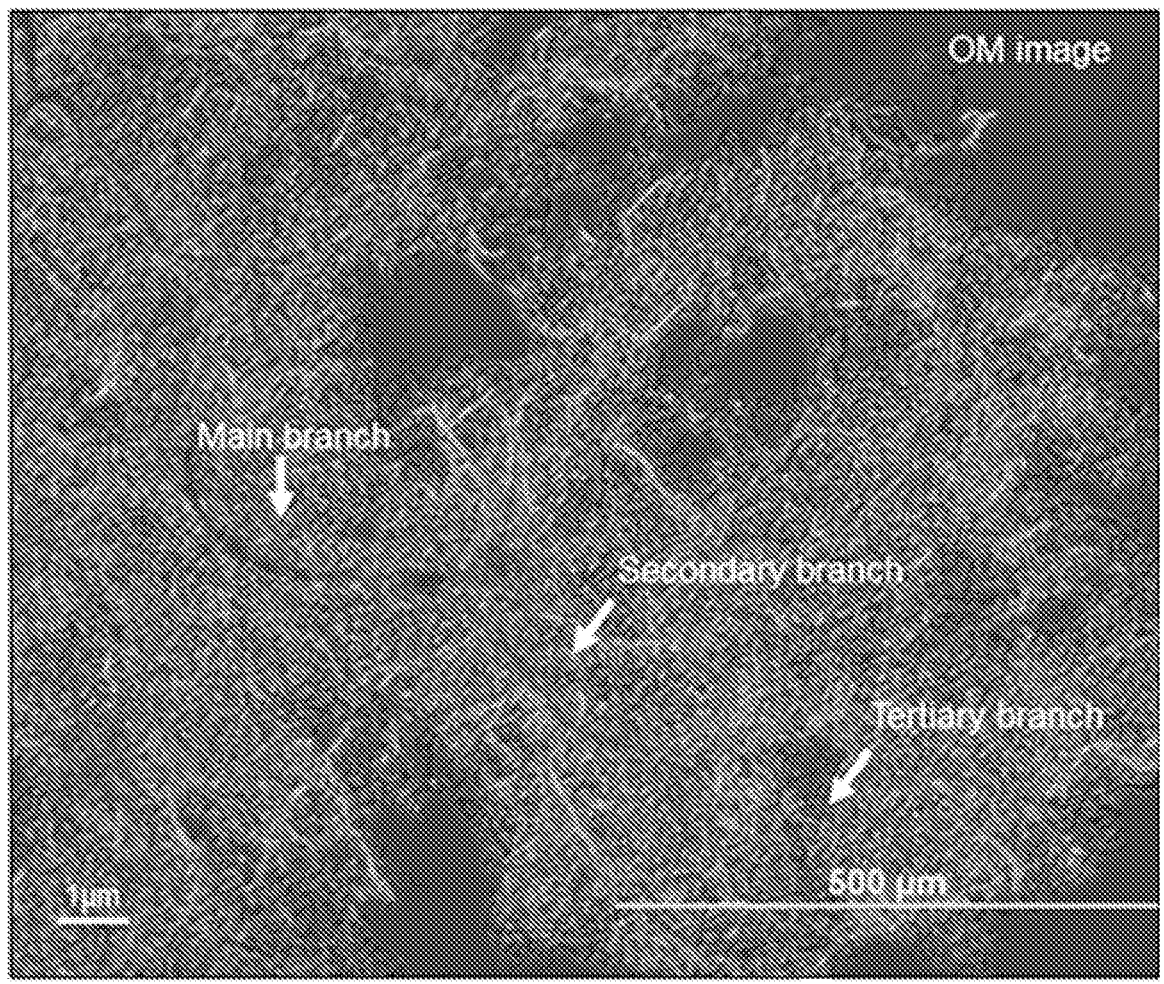
FIG. 1 is an optical microscope image of fractal-like particles (FLPs).

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of" the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Particles

In one aspect, disclosed are particles comprising an aggregate of polymer molecules, and having a branched fibrous structure that includes at least a first portion, a second portion and a third portion. The particles have a hierarchical structure of the branched fibers, as at each branch point extending outwards the diameters of the fibers decrease in size.

Throughout the disclosure, the terms "fractal-like", "dendrimeric", "hierarchical", "hierarchically branched" are used interchangeably to describe the particles.

Polymer

The particle comprises an aggregate of polymer molecules. The polymer may be branched or unbranched. The polymer may be any naturally-occurring or synthetic polymer capable of being fabricated into fractal-like particles. Non-limiting examples of polymers include many high molecular weight (MW) solution-processable polymers such as polyethylene (more generally, various polyolefins), polyvinyl alcohol, polystyrene, cellulose-based polymers, ethyl cellulose, cellulose acetate, poly(L-lactic acid) or PLA, polyacrylonitrile, polyvinylidene difluoride, conjugated organic semiconducting and conducting polymers, biopolymers such as polynucleotides (DNA) and polypeptides, etc. In certain embodiments, the polymer has a molecular weight average of between about 15,000 g/mol and about 1,000,000 g/mol.

Other examples of suitable polymers may include vinyl polymers such as, but not limited to, polyethylene, polypropylene, poly(vinyl chloride), polystyrene, polytetrafluoroethylene, poly(α-methylstyrene), poly(acrylic acid), poly(isobutylene), poly(acrylonitrile), poly(methacrylic acid), poly(methyl methacrylate), poly(l-pentene), poly(1,3-butadiene), poly(vinyl acetate), poly(2-vinyl pyridine), 1,4-polyisoprene, and 3,4-polychloroprene. Additional examples include nonvinyl polymers such as, but not limited to, poly(ethylene oxide), polyformaldehyde, polyacetaldehyde, poly(3-propionate), poly(10-decanoate), poly(ethylene terephthalate), polycaprolactam, poly(11-undecanoamide), poly(hexamethylene sebacamide), poly(m-phenylene terephthalate), poly(tetramethylene-m-benzenesulfonamide). Additional polymers include those falling within one of the following polymer classes: polyolefin, polyether (including all epoxy resins, polyacetal, polyetheretherketone, polyetherimide, and poly(phenylene oxide)), polyamide (including polyureas), polyamideimide, polyarylate, polybenzimidazole, polyester (including polycarbonates), polyurethane, polyimide, polyhydrazide, phenolic resins, polysilane, polysiloxane, polycarbodiimide, polyimine, azo polymers, polysulfide, and polysulfone.

As noted above, the polymer can be synthetic or naturally-occurring. Examples of natural polymers include, but are not limited to, polysaccharides and derivatives thereof such as cellulosic polymers (e.g., cellulose and derivatives thereof as well as cellulose production byproducts such as lignin), and food grade polymers (e.g., sodium alginate, agarose, gelatin) and starch polymers (as well as other branched or non-linear polymers, either naturally occurring or synthetic). Exemplary derivatives of starch and cellulose include various esters, ethers, and graft copolymers. The polymer may be crosslinkable in the presence of a multifunctional crosslinking agent or crosslinkable upon exposure to actinic radiation or other type of radiation. The polymer may be homopolymers of any of the foregoing polymers, random copolymers, block copolymers, alternating copolymers, random tripolymers, block tripolymers, alternating tripolymers, derivatives thereof (e.g., graft copolymers, esters, or ethers thereof), and the like.

In some embodiments the polymer comprises cellulose-based polymers, polystyrene, polyvinyl alcohol, polyvinyl acetate, polysulfone, polyacrylate, polyacrylamide, polyester, polycarbonate, polyvinylidene fluoride, polyaniline, polyurethane, polylactic acid, polylactic-co-glycolic acid, sodium alginate, agarose, polyester, gelatin or combinations thereof. In some embodiments, the polymer is selected from the group consisting of cellulose-based polymers, polystyrene, polyvinyl alcohol, polyvinyl acetate, polysulfone, polyacrylate, polyacrylamide, polyester, polycarbonate, polyvinylidene fluoride, polyaniline, polyurethane, polylactic acid, polylactic-co-glycolic acid, sodium alginate, agarose, polyester, gelatin and combinations thereof.

In some embodiments, the polymer comprises cellulose acetate, ethyl cellulose, polystyrene, polyvinyl alcohol, polysulfone, or combinations thereof. In some embodiments, the polymer is selected from the group consisting of cellulose acetate, ethyl cellulose, polystyrene, polyvinyl alcohol, polysulfone, and combinations thereof Portions The particles disclosed herein may include at least a first portion, a second portion and a third portion. In some embodiments, the particle includes more than three portions. The portions each may include a plurality of fibers, wherein the diameter of the fiber varies in a hierarchical manner. For example, the fiber diameters of the first portion may be greater than the fiber diameters of the second and third portions, and the fiber diameters of the second portion may be greater than the fiber diameters of the third portion. Accordingly, the fiber diameters within a portion may become smaller as the portion extends outward.

The particle may include a first portion that comprises a first plurality of fibers. The first plurality of fibers may have diameters of from about 10 times to about 100 times larger than the fiber diameters of the third portion, such as from about 20 times to about 90 times larger than the fiber diameters of the third portion, or from about 30 times to about 100 times larger than the fiber diameters of the third portion. In some embodiments, the first plurality of fibers may have diameters from about 1 µm to about 20 µm, such as from about 2 µm to about 15 µm, or from about 2 µm to about 10 µm. The first plurality of fibers may have a surface area constituting from about 10% to about 50% of the surface area of the particle, such as from about 10% to about 40% of the surface area of the particle, or from about 15% to about 40% of the surface area of the particle.

The particle may include a second portion that comprises a second plurality of fibers. The second plurality of fibers may extend from the first portion and may have diameters of from about 5 times to about 10 times larger than the fiber diameters of the third portion, such as from about 5 times to about 9 times larger than the fiber diameters of the third portion, or from about 6 times to about 10 times larger than the fiber diameters of the third portion. In some embodiments, the second plurality of fibers may have diameters from about 0.5 µm to about 3 µm, such as from about 0.5 µm to about 2.5 µm, or from about 0.5 µm to about 2 µm. The second plurality of fibers may have a surface area constituting from about 10% to about 60% of the surface area of the particle, such as from about 10% to about 50% of the surface area of the particle, or from about 20% to about 50% of the surface area of the particle.

The particle may include a third portion that comprises a third plurality of fibers. The third plurality of fibers may have diameters of less than about 1 µm, such as less than about 0.75 µm or less than about 0.5 µm. In some embodiments, the third plurality of fibers may have diameters of from about 20 nm to about 500 nm, such as from about 25 nm to about 450 nm or from about 30 nm to about 500 nm. The third plurality of fibers may have a surface area constituting from about 10% to about 70% of the surface area of the particle, such as from about 10% to about 60% of the surface area of the particle, or from about 20% to about 50% of the surface area of the particle.

Methods of Fabrication

Also disclosed herein are methods of fabricating particles comprising an aggregate of polymer molecules and having a branched fibrous structure. In particular, the present disclosure provides an efficient and scalable method for processing polymer solutions into fractal-like particles, which combines phase separation and shear forces. In some aspects, the methods may comprise a bulk process of anti-solvent-induced precipitation under shear stress in a dispersion medium. The methods are scalable and can be tailored to produce particles comprising a wide variety of polymers and having varying properties. In addition, the particles may be produced at a very low cost attributed to the present method.

In some embodiments, the methods comprise the use of shear stresses in a liquid-liquid dispersion system to form fractal-like particles. According to some embodiments, a precursor solution comprising a polymer solution is introduced into a dispersion medium. Any suitable means for introducing the precursor solution may be employed (e.g., syringe, tube, etc.). The precursor solution may include a polymer dispersed in any solvent ("polymer solvent") capable of dissolving the polymer and forming a stable solution. The precursor solution also may include one or more additives for various purposes such as, for example, to impart or enhance a certain function or property of the particles being formed, to facilitate the process by which the particles are formed, etc. In some embodiments, the precursor solution may be a polymer solution. In some embodiments, the precursor solution consists of a polymer solution.

The dispersion medium may comprise a component that behaves as an anti-solvent for the polymer of the precursor solution. The anti-solvent may be sufficiently miscible with the polymer solvent as to enable the particle formation in the manner described herein. The polymer solution may reside in the dispersion medium in the form of droplets dispersed throughout the volume of the dispersion medium. Depending on the nature of the polymer solution and the manner in which it is introduced, the polymer solution may enter the dispersion medium already in droplet form or may enter in a continuous stream and break up into droplets upon encountering the dispersion medium.

During the introduction of the precursor solution into the dispersion medium, the dispersion medium (now containing a plurality of dispersed-phase components of the precursor solution) may be sheared. Any means or device may be utilized to impart a shearing action to the dispersion medium in a batch or continuous process. Other applicable processes, specifically ones using a continuous flow conduit, are disclosed in U.S. Pat. Nos. 9,217,210 and 8,551,378, both of which are herein incorporated by reference in their entireties. In some embodiments, the dispersion medium may be flown through a high shear mixer as the precursor solution is introduced. The precursor solution may be introduced into the dispersion medium in a direction of the same direction as the flow of the dispersion medium, a direction opposite to the flow of the dispersion medium, or a direction orthogonal to the flow of the dispersion medium. In some embodiments, the precursor solution may be introduced at a volumetric flow rate ratio of at least about 1/10 relative to the dispersion medium. Upon introduction of the precursor solution, a dispersion system may be formed. Shearing of the dispersed-phase components via a high shear mixer may be done under turbulent flow. For example, the dispersion system may have a Reynolds number of about 3,000 or higher whereupon the particle is formed in the dispersion medium that is being sheared in a turbulent flow. In some embodiments, a high shear mixer may be operating at least at 5,000 rpm upon the dispersion medium being introduced. In some embodiments, the high shear turbulent flow is created via continuous high-rate flow in a pipe or a conduit.

In some embodiments, one or more surfaces confining the volume of the dispersion medium may be moved (e.g., rotated, translated, twisted, etc.) relative to one or more stationary surfaces or other moving surfaces.

The turbulent shearing of the dispersion medium may deform the polymer solution droplets into particles having a branched, hierarchical structure. At the same time, the polymer solvent, being miscible with the dispersion medium, may diffuse out from the droplets/particles and into the dispersion medium. As a result, insoluble fractal-like particles composed of polymer molecules may be formed. From the point in time at which the precursor solution begins to be added to the dispersion medium, the duration of time required to form the particles in a batch process may be on the order of seconds to minutes. Generally, the production rate may scale with the volume of the apparatus. In some embodiments, the particles may be formed at a concentration of 5 g/L.

Once the particles have been formed as described above, the particles may be removed from the apparatus and subjected to any desired post-fabrication procedures. For instance, the as-formed particles may be subsequently washed with a low-viscosity anti-solvent, collected, and dried. The particles may be utilized to produce nonwoven webs for various applications. The anti-solvent may be recycled and re-circulated to the apparatus after the polymeric particles are separated from the suspension. Additionally, the particles may be processed, separated or utilized as needed to fabricate any desired end-product.

A notable advantage of the present method is that it is not limited to the use of any particular polymer or class of polymers. Non-limiting examples of polymers that may be used in the present methods are listed above.

The polymer solvent may be any solvent capable of dissolving the polymer being processed, and which is completely or partially miscible with the anti-solvent dispersion medium to a degree sufficient for forming particles in accordance with the present disclosure. Complete or full miscibility generally means that two (or more) liquids are miscible with each other in all proportions. Partial miscibility generally means that the degree to which the two (or more) liquids are miscible with each other is not necessarily the same. Typically, partially miscible solvents have a solubility in each other of at least 5 g/L at 25° C. For convenience, the term "miscible" as used herein encompasses partial miscibility as well as full miscibility, consistent with the foregoing statements. Non-limiting examples of polymer solvents may include chloroform ($CHCl_3$), acetone, toluene and other polar and non-polar organic solvents, water, water with varied pH values, water with varied salt concentrations, dissolved and supercritical carbon dioxide, mixtures of two or more of the foregoing, and mixtures of one or more of the foregoing with other solvents.

In addition, while the polymer solvent may be capable of being miscible with the anti-solvent, there is a threshold level of miscibility that produces fractal-like particles. This threshold of miscibility is defined here on the basis of the Hildebrand solubility parameter ($\delta$). The Hildebrand solubility parameter provides a quantitative evaluation of the degree of interaction between solutions. It is known within the art that the interaction energy between solvent and anti-solvent can be calculated from the difference between Hildebrand solubility of solvent ($\delta_2$) and nonsolvent ($\delta_3$): $(\delta_2-\delta_3)^2$. Relatively small differences between solubility parameters means high mutual affinity and high difference means low affinity. The particles of the present disclosure may be formed with solvent-anti-solvent pairs having a high solubility parameter difference. Particles disclosed herein may be fabricated when the difference of solubility parameter is greater than 500 MPa, but particle fabrication is not limited to this value. For example, particle formation can generally be achieved by factors that can delay the precipitation of the polymer solution. Factors that can delay the precipitation rate include, but are not limited to, a high solubility parameter value between solvent-anti-solvent (as listed above), and having a small difference in pH or electrolyte concentration in water. Regarding a differential pH or electrolyte concentration, in these embodiments the solvent-anti-solvent should be miscible. Non-limiting examples of solvent-anti-solvent pairings of which the solubility parameter distance is not greater than 500 MPa, but can still be used to provide the disclosed particles are listed in Table 1.

TABLE 1

Example of Polymer Solvent Anti-solvent Pairs for FLP

| Polymer | Solvent | Antisolvent |
|---|---|---|
| Sodium alginate | Water | Water (pH < 7) |
| Sodium alginate | Water | Water + ~0.01 wt. % calcium chloride ($CaCl_2$) |
| Polyvinylidene fluoride | DMSO (dimethyl sulfoxide) | Isopropyl alcohol, ethanol, methanol |
| Polyester | Chloroform | Isopropyl alcohol, ethanol, methanol |
| Polyvinyl alcohol | Water | Isopropyl alcohol, ethanol, methanol |

In some embodiments, the particles may be formed when the polymer is dissolved in tetrahydrofuran, which is miscible but has a low affinity with water (anti-solvent). Table 2 below lists the solubility parameters of solvents that may be used, but is not limited to, in the disclosed methods.

TABLE 2

Solubility Parameters

| Solvents | $\delta$ [$MPa^{1/2}$] |
|---|---|
| Ethyl acetate | 18.6 |
| Tetrahydrofuran | 18.6 |
| Acetone | 20.3 |

TABLE 2-continued

Solubility Parameters

| Solvents | $\delta$ [$MPa^{1/2}$] |
|---|---|
| Acetic acid | 20.7 |
| Pyridine | 21.9 |
| Dimethylacetamide | 22.1 |
| Dimethylformamide | 25.2 |
| Dimethyl sulfoxide | 29.7 |
| Glycerol | 33.8 |
| Water | 47.9 |

Polymer solution concentration affects the production of fractal-like particles of the present disclosure, as opposed to forming other shaped particles (e.g., rods, sheets, etc.). In some embodiments, the precursor solution comprises polymer dissolved in a polymer solvent at a concentration of from about 3% to about 10% by weight, such as from about 3% to about 9% by weight or from about 4% to about 10% by weight.

The dispersion medium may include any component or components that serve as an anti-solvent for the polymer being processed, but which is miscible with the polymer solvent being utilized. Stated in another way, the anti-solvent may be any liquid or solution in which the polymer does not dissolve. Non-limiting examples of dispersion media may include various alcohols, such as ethanol, methanol, isopropanol, glycerol or the like, and combinations of two or more alcohols such as glycerol/ethanol, as well as water. As an example, glycerol may be included to control the viscosity of the dispersion medium, with ethanol or water also included for its miscibility with the polymer solvent to provide a pathway for the polymer solvent to leave the particles whereby the particles can be stably formed. Various biopolymers, biomacromolecules, conditioners and thickeners may also be used to adjust the media viscosity.

In some embodiments, the viscosity of the dispersion medium ranges from about 0.5 cP or greater. In other embodiments, the viscosity of the dispersion medium ranges from about 1 cP to 1500 cP (or higher).

The insolubility of the polymer in the dispersion medium may be characterized as the polymer having a solubility in the anti-solvent of (or comprising) the dispersion medium of less than about 2 g/L at 25° C., such as less than about 1 g/L at 25° C., less than about 0.5 g/L at 25° C., or less than about 0.1 g/L at 25° C.

The concentration and/or volume of the anti-solvent medium may depend on the polymer-anti-solvent interactions as well as the polymer-solvent interactions. For a system where the polymer is barely soluble in the solvent, small amounts of anti-solvent may be sufficient for the formation of particles.

In addition, additives may be added to the polymer solution or the dispersion medium for various purposes. Examples of additives include, but are not limited to, adhesive, colorants (e.g., fluorescent dyes and pigments), odorants, deodorants, plasticizers, impact modifiers, fillers, nucleating agents, lubricants, surfactants, wetting agents, flame retardants, ultraviolet light stabilizers, antioxidants, biocides, thickening agents, heat stabilizers, defoaming agents, blowing agents, emulsifiers, crosslinking agents, waxes, particulates, flow promoters, battery electrodes, battery separators and other materials added to enhance processability or end-use properties of the polymeric components. Such additives may be used in conventional amounts.

These additives may be added before, during or after formation of the polymer dispersion and/or formation of the polymer particles. In some embodiments, a surfactant, such as a nonionic or anionic surfactant, may be added to a solution comprising the particles in order to enhance dispersion of the particles in the solution, particularly where the particles are in an aqueous solution.

Use of Particles

Figure 32:
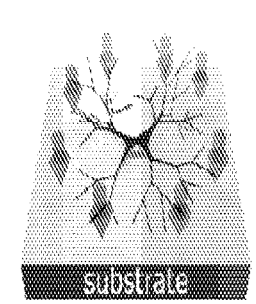
FIG. 32 is a summary of the unique properties of fractal-like particles for many diverse industrial applications.

The disclosed particles may be useful in a variety of different applications. For example, particles may be used in diverse industrial areas (see FIG. 32) such as viscosity modifiers, gelation-inducing agents, food and cosmetic additives, dry adhesives for all kinds of substrates, textile or nonwoven finishing materials. In addition, the particles may be used in various materials such as nonwoven sheets, bioscaffolds, water filtration membranes, 3D porous materials such as aerogel and sponges. The particles and materials may be produced at very low costs, and may be applied to many inexpensive commercial polymers.

The particles may be used as part of a coating composition, for example a coating film. In some embodiments, the coating may be a functional coating for flat or textured surfaces, and the particles may instill certain characteristics to the coating, such as superhydrophobicity, superoleophobicity, superhydrophilicity, icephobicity, absorbing light of specific wavelength range, self-decontamination, degradation of warfare and/or lethal agents, self-cleaning, coloring, heat insulation, sound absorbency, desired tribology, wear resistance and antimicrobial properties, flame retardancy, high surface area to volume ratio and related properties. In some embodiments, the coating may be infused with a liquid layer that can act as a slippery surface to various liquids. In some embodiments, the coating may be super hydrophobic having a contact angle measurement for water of greater than 150°, the coating may be hydrophilic, or the coating may be icephobic. The coating may be repellent to liquids, such as, but not limited to, hydrocarbon oil, alcohol, ester, fatty acids, vegetable oil, milk oil, animal oil or combinations thereof. In addition, the coating may be part of a coating composition where one side is hydrophobic and the opposing side is hydrophilic, e.g., a Janus coating composition.

Figure 28:
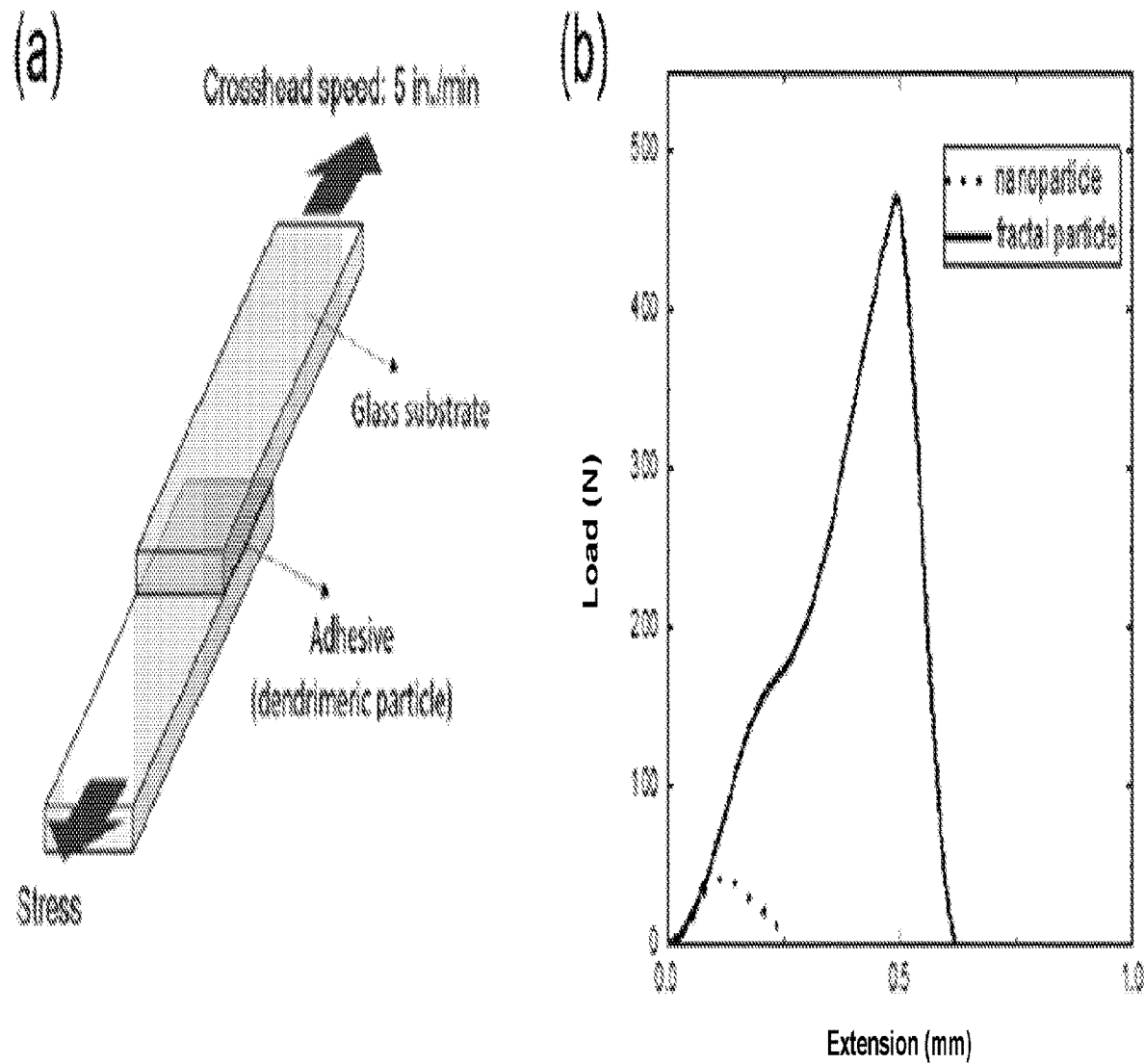
FIG. 28(a) is a schematic depicting the lap shear test.
FIG. 28(b) is a graph showing the adhesion strength of fractal-like particles relative to spherical particles.

Coating compositions comprising the disclosed particles may exhibit superior adhesion properties compared to alternative coating formulations, e.g., polymers not in particle form or particles not having a hierarchical structure (e.g., spherical particles). In some embodiments, fractal-like particle coatings have an adhesion strength of at least about $1 \times 10^5$ Pa as measured by a lap shear test (see FIG. 28).

The substrate for the FLP coating may be a surface with various topology such as flat surfaces, rough surfaces, and/or porous surfaces. A non-limiting example of a flat surface are windows. Examples of rough surfaces include, but are not limited to, a wall, and/or a building interior. Examples of porous surfaces include, but are not limited to, nonwovens, wovens, papers and/or membranes.

The substrate for the FLP coating may also be a micro-sized objects such as microfibers, microparticles (e.g., of spherical or low aspect ratio), and agricultural seeds. FLPs can engulf a single fiber to change the physical properties of the fiber. The physical properties include surface structure, hydrophobicity, surface area, and mechanical modulus. FLPs can bind more than two fiber. Accordingly, the FLP coating may be used to provide superhydropobic fibers.

Figure 30:
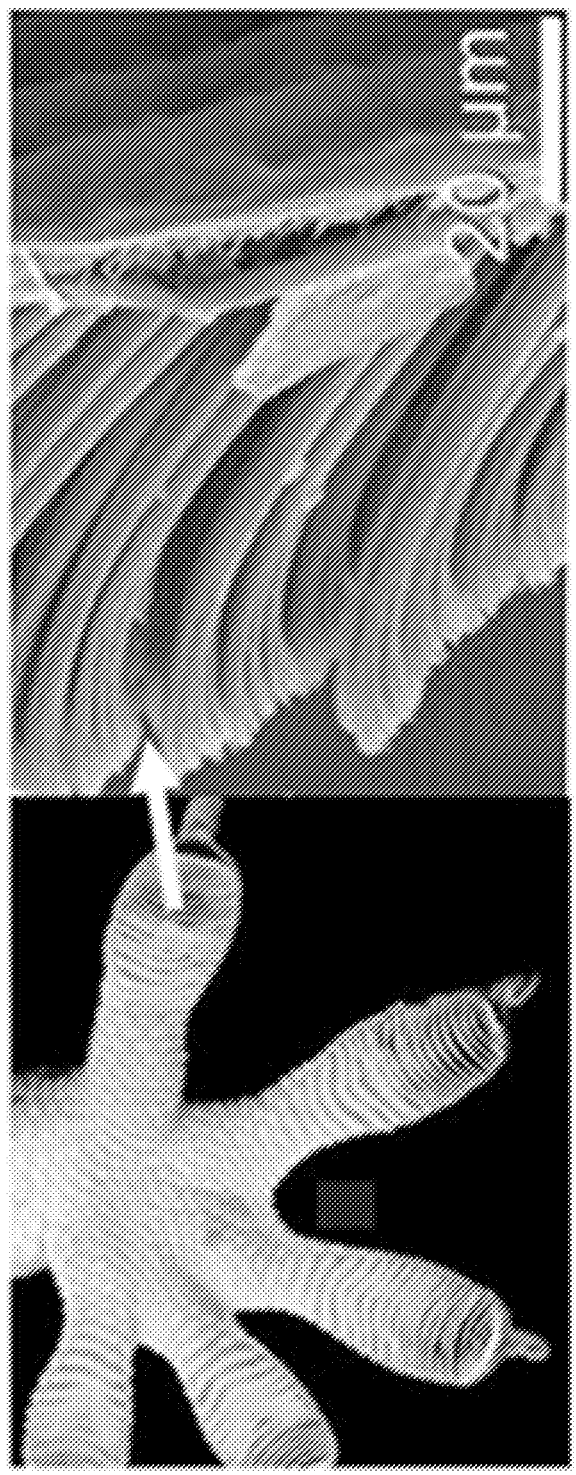
FIG. 30 is an optical image and an SEM image showing the structure on the legs of gecko lizards that enables their ability to cling to surfaces.
Figure 31:
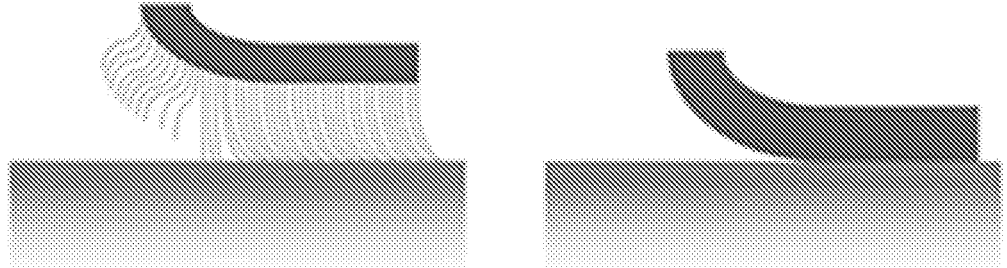
FIG. 31 (a-e) is a schematic depicting factors involved in the "contact splitting" phenomena behind the gecko leg effect. Contact splitting enables stronger adhesion of nano-fibrous coatings than continuous films. (This figure comes from Kamperman, M.; Kroner, E.; Del Campo, A.; McMeeking, R. M.; Arzt, E. *Adv. Eng. Mater.* 2010, 12, 335-348 and Kamperman, M.; Kroner, E.; Del Campo, A.; McMeeking, R. M.; Arzt, E. *Adv. Eng. Mater.* 2010, 12, 335-348, both of which are herein incorporated by reference in their entirety.)
Figure 31:
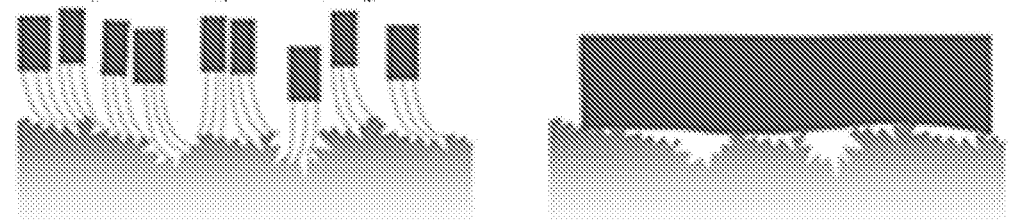
Figure 31:
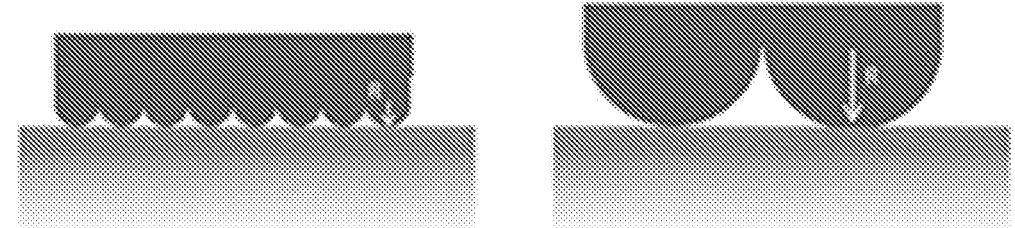
Figure 31:
Figure 31:

Without being bound to a particular theory, it is hypothesized that this strong adhesion has origins similar to the highly adhesive "gecko legs" of the gecko lizard, which are naturally coated with nanofiber layers (FIG. 30). In addition, the concept of "contact splitting" can be used to help explain the superior adhesion of the disclosed fractal-like particles. Contact splitting may be explained as a series of effects, including the extrinsic contribution of the nano-fiber surfaces to the work of adhesion, nano-fiber adaptability to rough surfaces, size effect due to surface-to-volume ratio (Johnson-Dendall-Roberts concept), uniform stress distribution, defect control, and adhesion redundancy (FIG. 31). Thus, it is hypothesized that the nanofibers of the corona of the fractal-like particles (e.g., fibers of the third portion), allow coatings/nonwovens to have enhanced adhesion strength. The particles may also be the basis of a number of other useful applications due to the unusually high "stickiness" and/or adhesiveness of the disclosed fractal-like particles. As shown in the examples below, the Van der Waals interactions between the particle and substrate can enable the particle to stick to almost any type of surface. This may mean that the adhesion is universal, regardless of substrate (similar to the so-called "gecko legs").

EXAMPLES

Example 1: Fabrication and Characterization of Particles

Materials:

Polystyrene (PS), tetradydrofuran (THF), and deionized water were used as solvents and media. Polystyrene (Mn: ~140,000 and Mw: ~230,000, Mw/Mn=1.64) was purchased from Sigma-Aldrich (USA). THF used as solvent and ethanol (+99%) used as dispersion medium were purchased from VWR (USA). Deionized water was used as an anti-solvent, which induced polymer precipitation. Hydrophilic fumed silica and sunflower oil, which are commonly used thickening agents, were purchased from Sigma-Aldrich (USA).

Determination of PS/THF/Water Phase Diagram:

Polystyrene pellets were dissolved in THF in 30 mL vial using magnetic stirrer. After completing the dissolution, polymer solution was slowly titrated with water until hazing. Based on the point where the polymer solution turned into the hazy phase, ternary phase diagram was plotted by normalizing the fractions of each component (PS, THF, and water).

Preparation of Polymer Particles from High-Sheared Liquid-Liquid Dispersions:

The preparation of fractal-like particles was based on the liquid-liquid dispersion technique (Alargova, R. G., Bhatt, K. H., Paunov, V. N. & Velev, O. D. Scalable synthesis of a new class of polymer microrods by a liquid-liquid dispersion technique. *Adv. Mater.* 16, 1653-1657 (2004), which is herein incorporated by reference in its entirety). Polymer particles were produced in colloidal mill (high shear mixer IKA mill with rotor stator design, IKA® magic LAB, USA). The high shear mixer was first filled with 500 mL of DI water. The polymer solution in THF was injected through the nozzle with ~1 mL/s of volumetric flow rate after reaching the set rotor rate. Upon injecting, precipitated polymer particles floated on the water since these particles were adsorbed around bubbles formed by the high shear mixer. The particles floating on the water were collected into 50 mL centrifuge tube (Genesse Scientific, USA). The collected polymer particles were then dispersed in ethanol and dried in an oven at 60° C.

Characterization:

Optical microscopy (Olympus BX-61 microscope with a DP-70 digital CCD camera, Olympus, Japan) was utilized for morphological analysis. The polystyrene fractal-like particles collected from the high shear mixer were then diluted in ethanol and well dispersed with a magnetic stirrer. The diluted polymer dispersion was then directly analyzed with the optical microscope. For further characterization of the particle structure, Field-Emission Scanning Electron Microscope (FE-SEM, Verios, FEI, USA) was used. Each sample was coated by Pt/Pd film with a thickness of ~7 nm.

Figure 2:
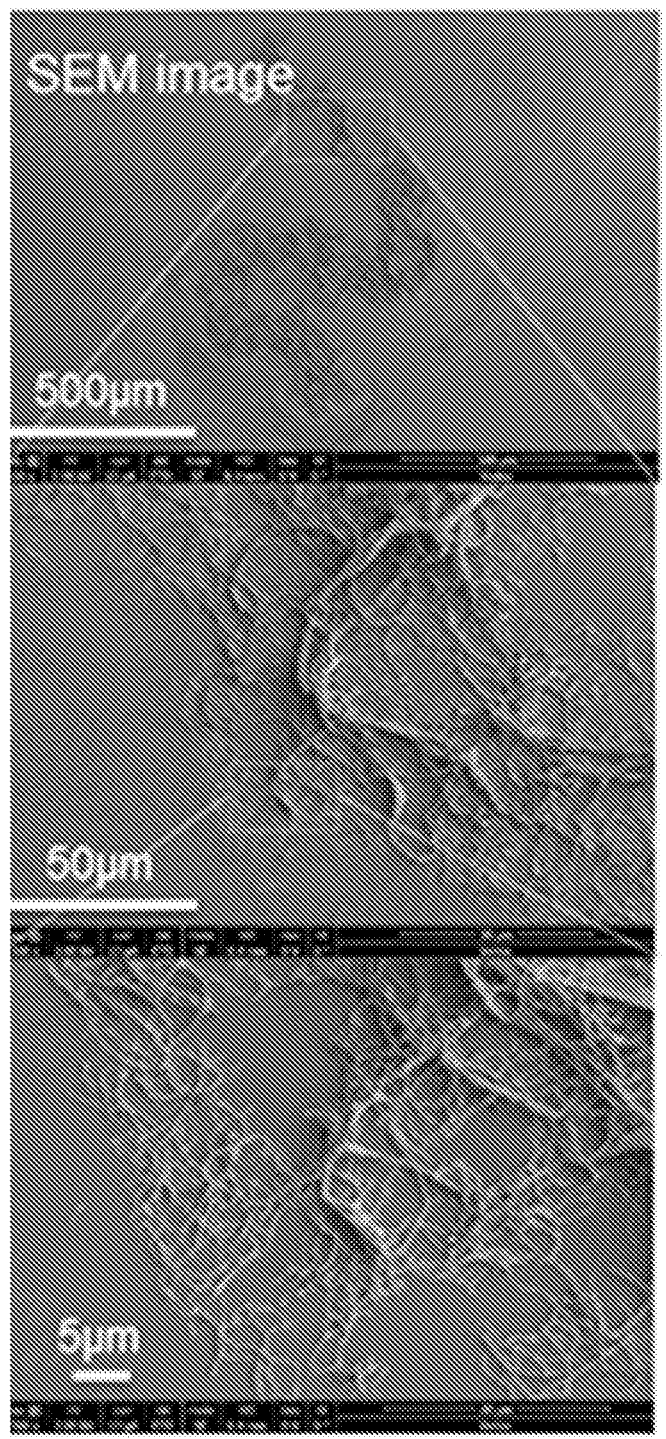
FIG. 2 is a series of scanning electron microscope images of fractal-like particles.
Figure 3:
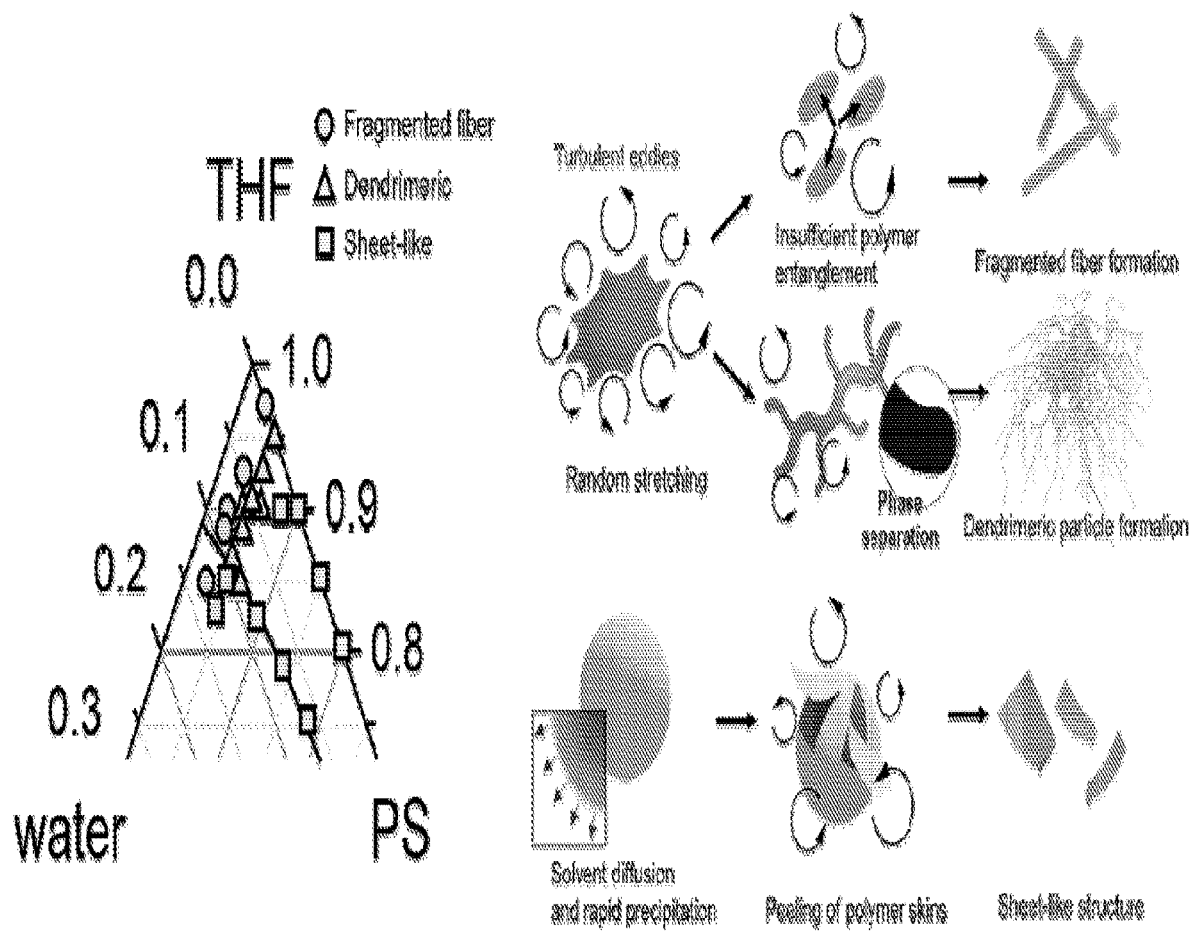
FIG. 3 is a phase diagram of polystyrene (PS)/tetrahydrofuran (THF)/water mixture, correlated to various shapes of particle formed by the procedure.

Optical and scanning electron microscope images of fractal-like particles prepared from high sheared liquid-liquid dispersions are shown in FIGS. 1 and 2. The polymer particle precipitates have self-similar structure in multiple dimensions, which is analogous to the typical fractal structures in nature. While not being bound to any particular theory, the formation of these fractal-like particles may be attributed to two simultaneous processes: 1) polymer solution phase separation upon solvent and anti-solvent exchange and 2) vigorous random stretching of polymer droplet with eddies of turbulent flow. The used anti-solvent medium was miscible with the polymer solution but immiscible with the polymer itself. This made the interfacial tension between polymer solution phase and anti-solvent medium very low. The fractal-like structure was originally fabricated from an extremely high shear mixer, which generated turbulence into the anti-solvent medium. When the polymer solution was injected into anti-solvent shear medium, the solution phase was stretched in random directions, while anti-solvent and solvent were exchanged at the polymer solution boundary. Also, upon infusion, polymer solution droplets were separated into polymer-rich and polymer-lean phases because single phase was thermodynamically unstable. At the beginning of the phase separation, microscopic polymer lean phases were coagulated into larger droplets, which was more thermodynamically favored within the boundary of the polymer domain. The schematic describing the hypothesized formation of fractal-like structures is shown in FIG. 3. Furthermore, the disclosed method was used to provide fractal-like particles from other polymers, including polysulfone, ethyl cellulose, cellulose acetate and polyvinyl alcohol. These different embodiments can be seen in FIG. 10-16.

Varying the initial concentration of polymer solution induced changes in polymer precipitants morphology. FIG. 3(a) shows PS/THF/Water ternary phase diagram, where the phase boundary between one-phase and two-phase regions is presented as a bold black line. The circles, triangles, and squares correspond to the initial polymer concentrations turned into fragmented fiber, fractal, and sheet-like structures. When the polymer concentration is large enough, sheet-like structures tended to form. However, when the polymer concentration was lower, fragmented fractal-like structures were produced. The fractal-like structures were formed from concentration ranges corresponding to intermediate regions between sheet-like structure forming region (squares in FIG. 3(a)) and fiber structure forming region (circles in FIG. 3(a)). The change in the polymer morphology from fiber to fractal-like structure can be explained with the presence of polymer entanglement in initial polymer solution. When the initial concentration of polymer solution is below that of the entanglement regime, polymer solution droplets were more prone to be broken down into smaller pieces before reaching high enough polymer concentration upon diffusion. Without being bound to any particular theory, it is hypothesized that viscoelasticity and fragility of the semi-precipitated polymer phases may also have an influence on the outcome; however, the entanglement of polymer chains under shear stress of anti-solvent medium is thought to play the most pivotal role on continuous stretching.

Another morphological transition from fractal-like to sheet-like structures was observed. As the concentration of the polymer solution increases, the viscosity also increases but the diffusion coefficient decreases. At the interface between the polymer solution and the anti-solvent medium, solvent and anti-solvent was exchanged. However, due to the higher viscosity of the polymer solution than that of the anti-solvent, the diffusion coefficient in the polymer solution was lower than that of the surrounding medium. The difference in diffusion coefficients induced imbalance in solvent and anti-solvent exchange rates. As a result, thin polymer skin was generated at the surface of the polymer solution droplets. This nanoscale thick skin was peeled off into separated thin sheets due to high shear energy generated by turbulent flow.

The effects of the hydrodynamic pressure and the anti-solvent type on the polymer structure were investigated by Poiseuille flow device. The shear medium was flown in a tube, while the polymer solution was injected from the side and sheared at different flow rates.

Figure 4:
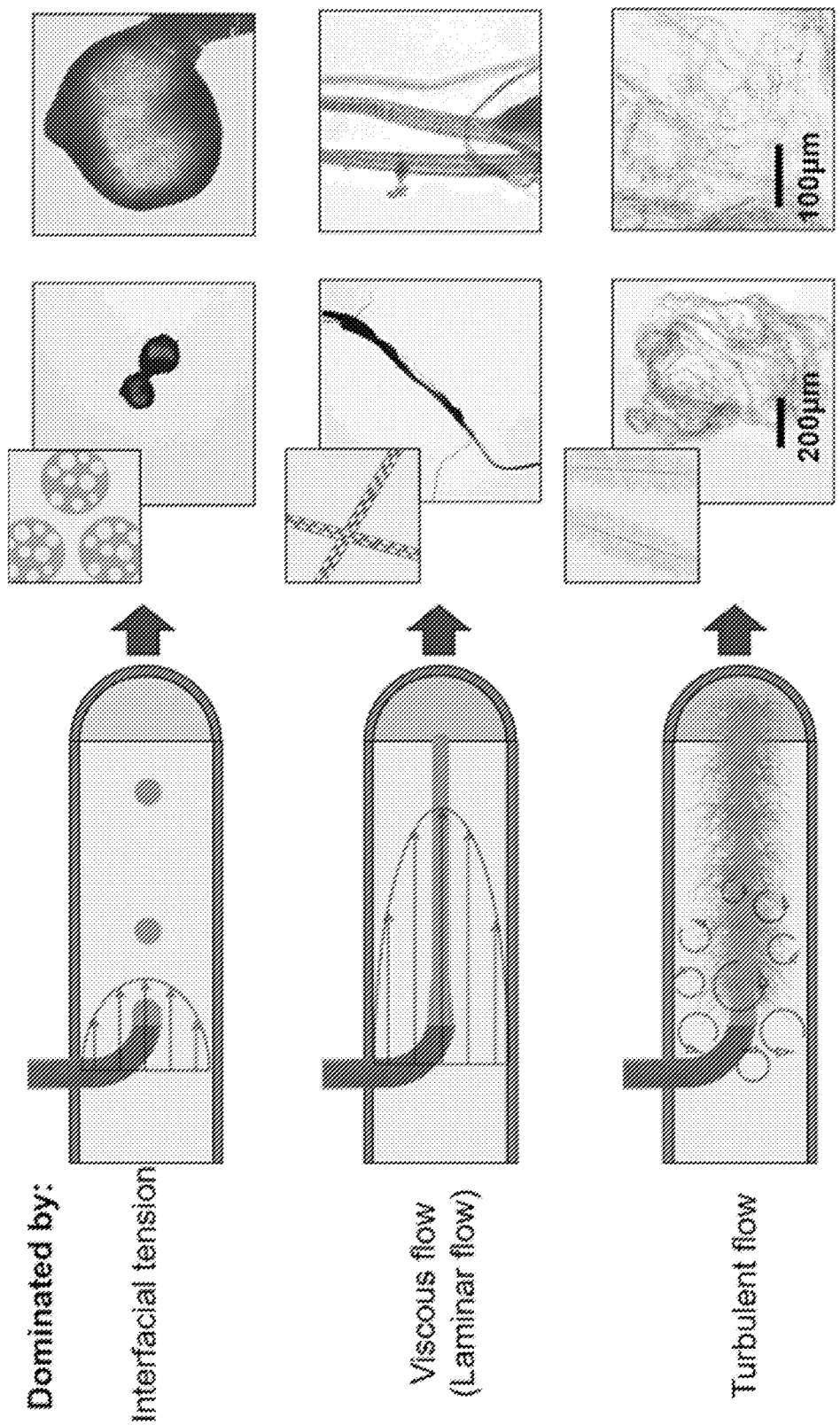
FIG. 4 is a diagram showing a schematic of various structures forming as a result of changing the shear rates in simple flow in a tube as the Reynolds number increases, as well as optical microscopy of the resulting spherical, fiber, and fractal-like particles.

FIG. 4 summarizes the various types of polymer structures observed as result of gradually changing the shear at rates corresponding to flow transition from laminar to turbulent.

Overall, the polymer precipitants had spherical, fiber-like, and fractal-like structures. The transition from sphere-like to fiber-like structure can be correlated to the capillary number (Ca) accounting for the viscous force over interfacial tension (equation 1).

$$Ca = \frac{\mu V}{\gamma} \quad (1)$$

where $\gamma$ is interfacial tension, $\mu$ is the viscosity of anti-solvent medium and V is the characteristic velocity. A high capillary number was needed to stretch polymer solution droplets by overcoming their interfacial tension to make fiber structure in laminar flow regime. At lower shear rates, when the interfacial tension between polymer solution and anti-solvent medium governed the viscous flow of anti-solvent, spherical particles were formed. These spherical particles have porous structure caused by anti-solvent-induced phase separation. Polymer fibers, similar to those reported in Smoukov et al. (Smoukov, S. K. et al. Scalable Liquid Shear-Driven Fabrication of Polymer Nanofibers. *Adv. Mater.* 1-6 (2015), which is herein incorporated by reference in its entirety) formed at higher laminar flow rates. As the shear stress increased further, the flow became turbulent, and the spherical PS particles started to evolve into fractal-like particles. In the turbulent flow, vortex stretching is exerted in numerous flow directions. Upon solvent and anti-solvent exchange on the boundary, polymer solution was phase-separated forming polymer "fingers" and eventually nanofibers. Without being bound to a particular theory, it is hypothesized that the fractal-like morphology is a result of the combined action of both phase separation and random stretching of the polymer droplets in anti-solvent-sheared medium. The schematics on the formation processes of spheres/chunks, fibers, and fractal-like particles are shown in FIG. 4

Figure 25:
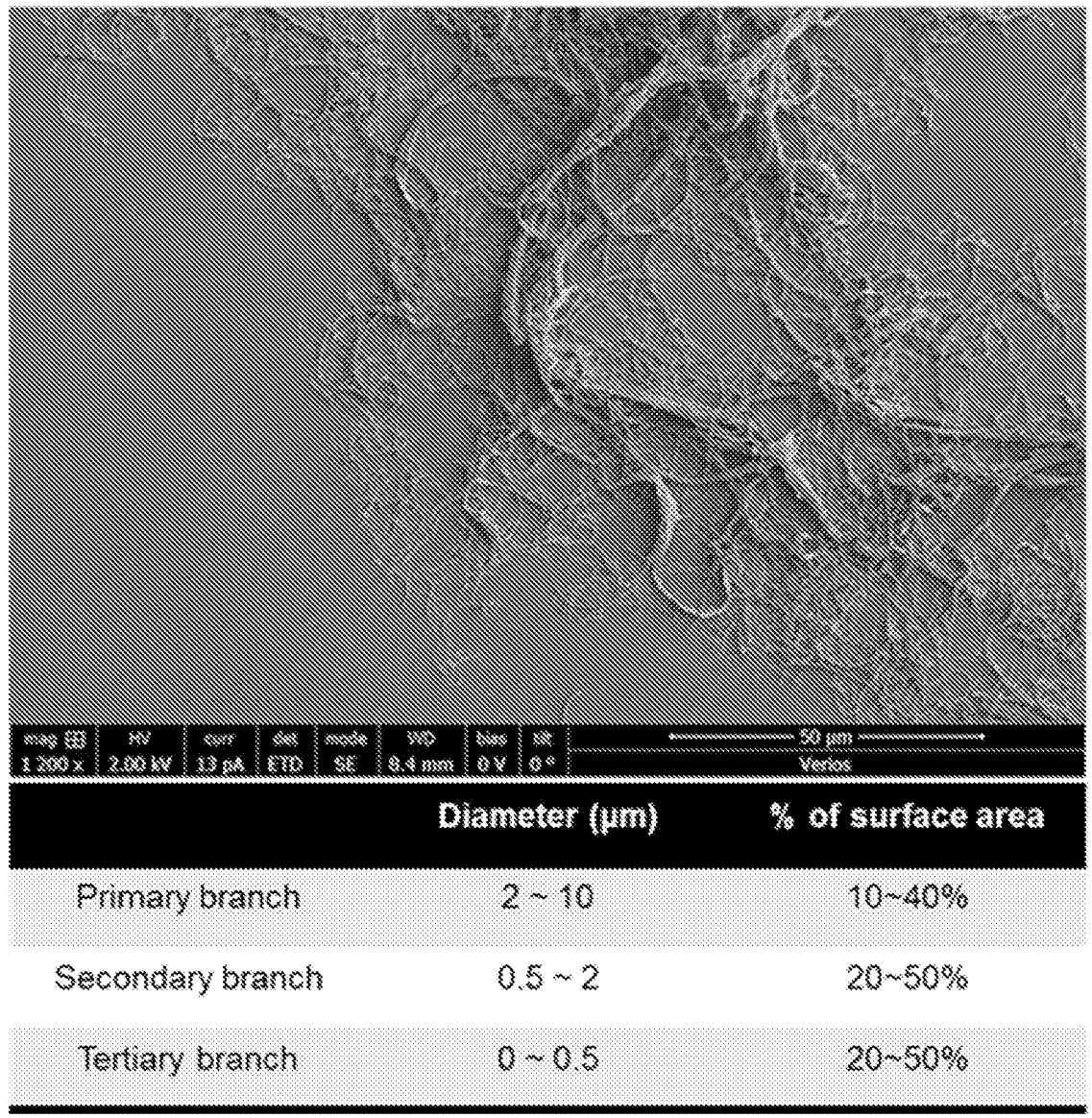
FIG. 25 is a scanning electron microscope image of fractal-like particles made from polystyrene, and the corresponding surface area analysis of the varying portions.

The fractal-like polymer particles have multiple fibrous side branches ranging in size from ~20 nm to 10 μm. The surface area and diameters were calculated via analysis of images of fractal-like particles as disclosed in FIG. 25. The technique to make said particles utilized anti-solvent induced phase separation and flow shear in a pipe. It was discovered that such particles are formed in a turbulent flow regime and that the shapes of precipitated polymer particles could be controlled by the shear rate and flow rate of the anti-solvent medium. Spherical, fiber-like and fractal-like particles have been observed at increasing flow rates. The concentration of polymer solution was also a factor in producing fractal-like particles. Higher concentration of polymer solution precipitated nanometer-thick polymer skin on the surface, which peeled off to form sheet-like particles. Lower concentrations resulted in fractal-like structure.

Example 2: Use of Particles in Coatings and Nonwovens

Figure 9:
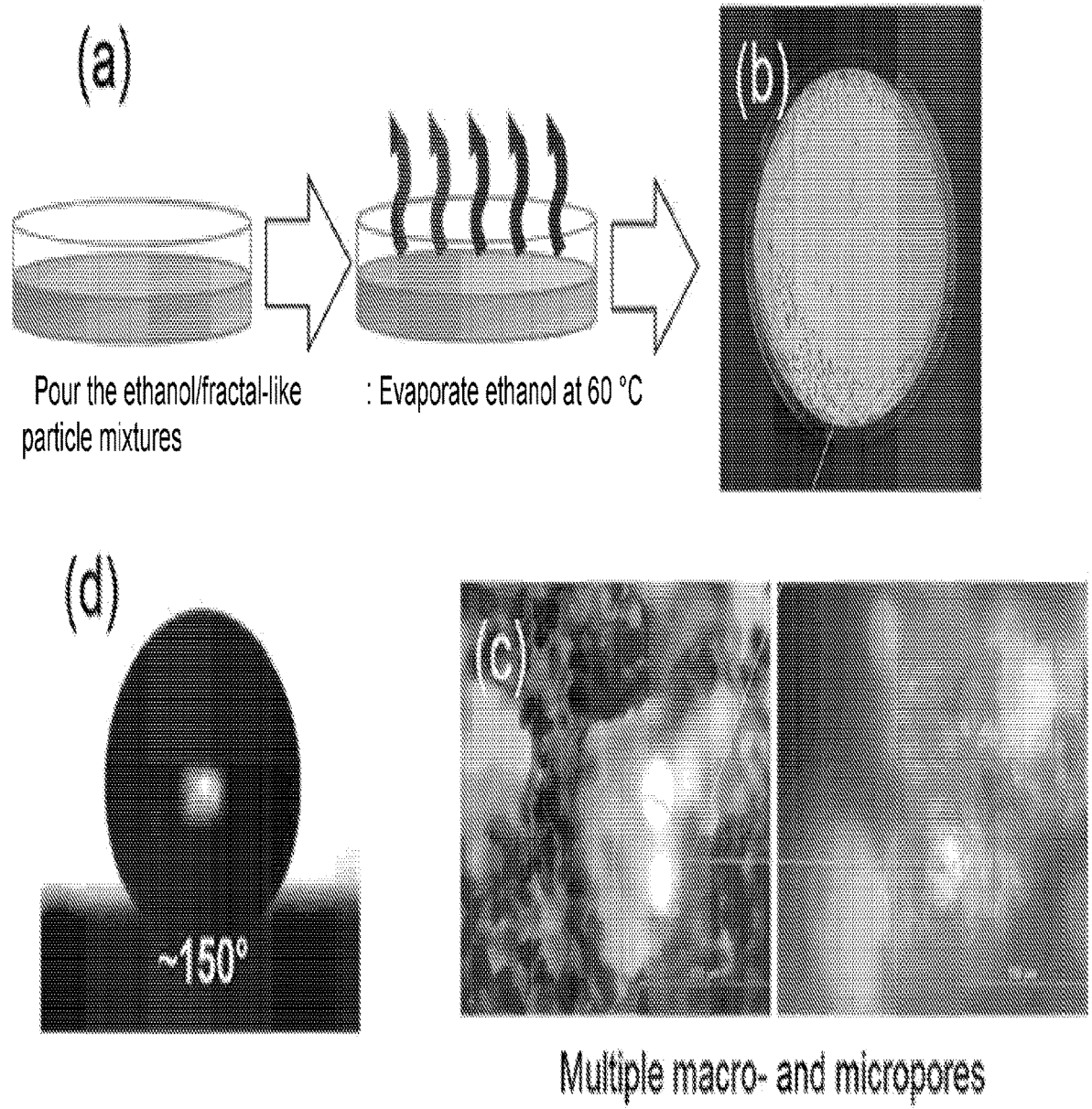
FIG. 9(a) is a schematic showing the formation of a super hydrophobic surface.
FIG. 9(b) is a photograph showing the visual large-scale appearance of a superhydrophobic surface.
FIG. 9(c) is a pair of microscopic images showing the morphology of the superhydrophobic surface.
FIG. 9(d) is a side image of a water droplet residing on the superhydrophobic surface.
Figure 10:
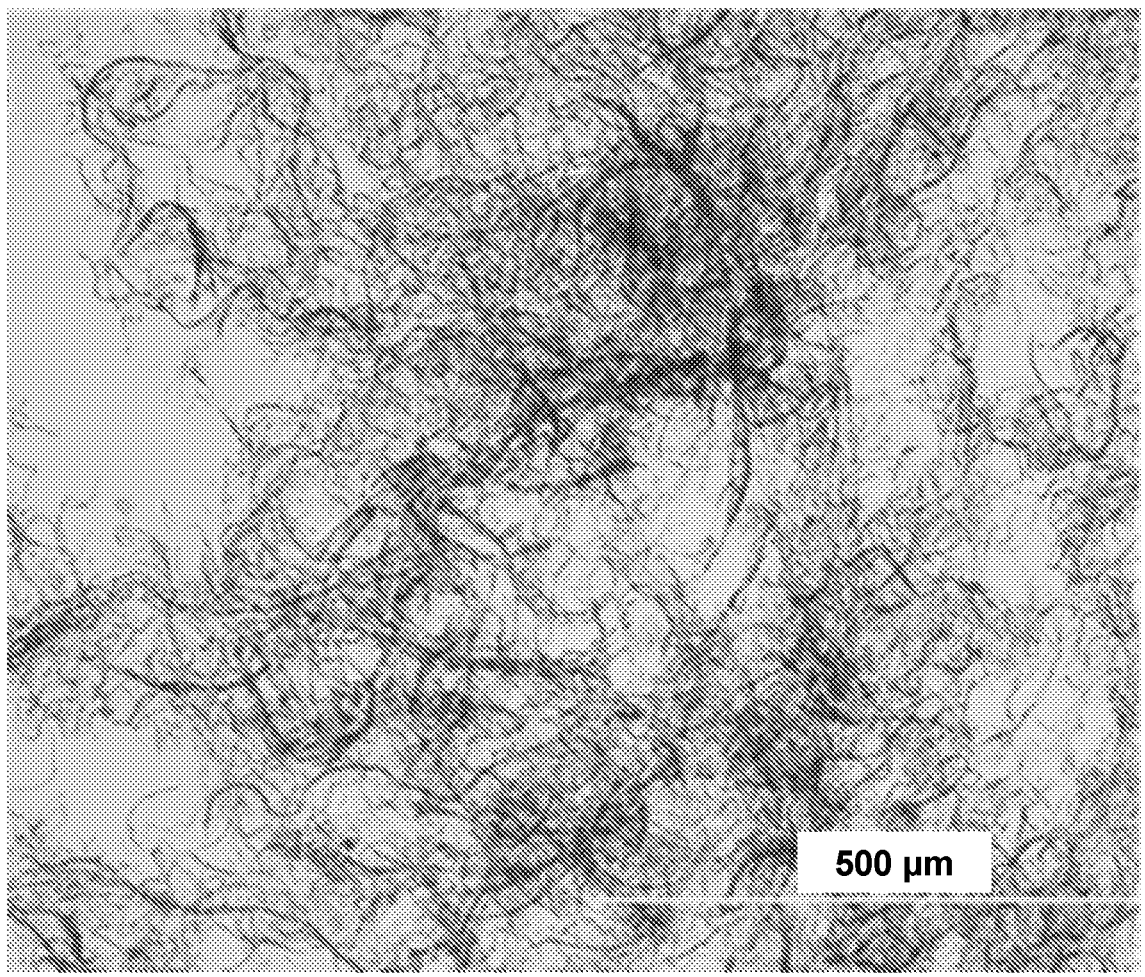
FIG. 10 is a microscope image of fractal-like particles made from polysulfone.
Figure 11:
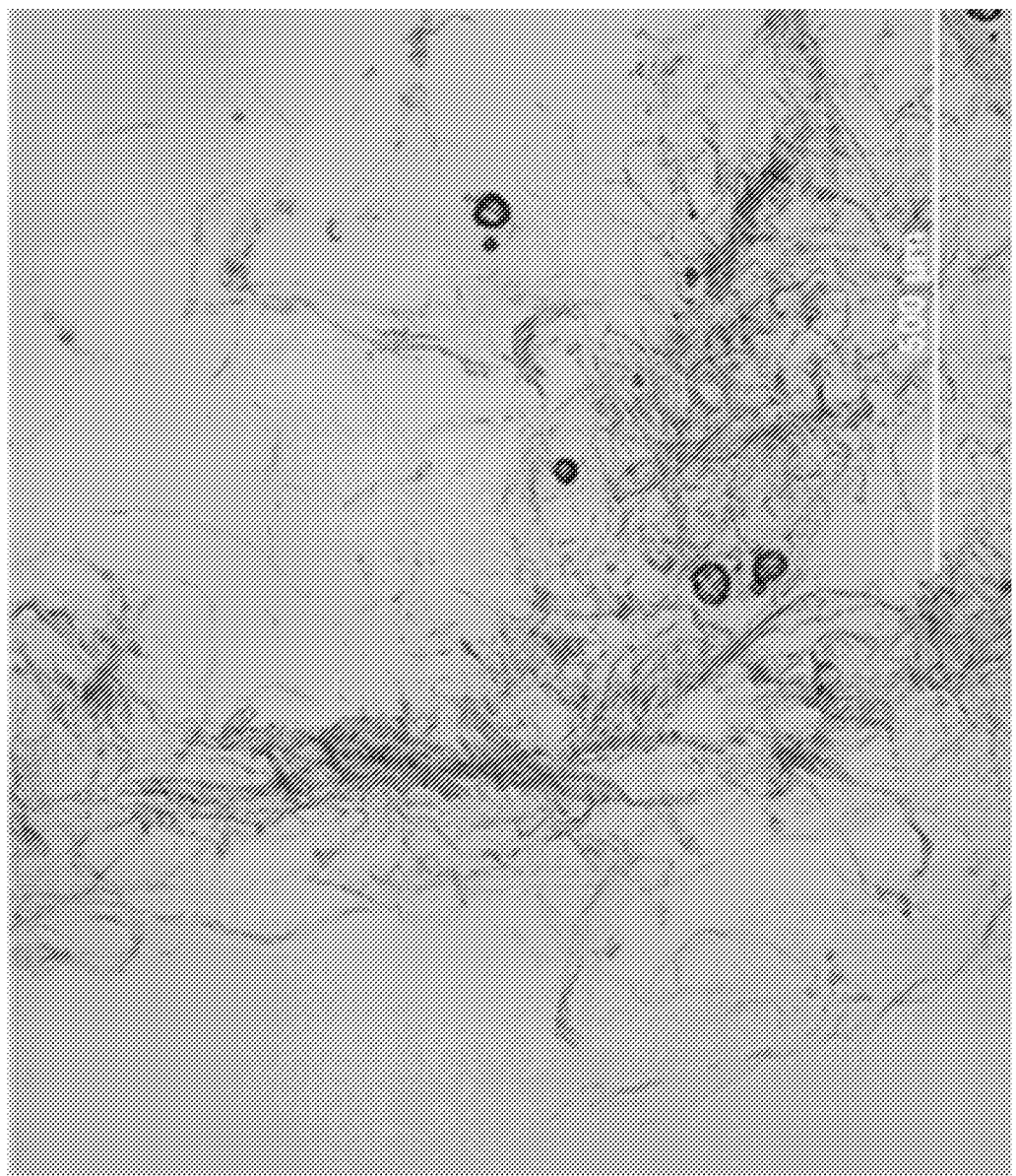
FIG. 11 is a microscope image of fractal-like particles made from ethyl cellulose.
Figure 12:
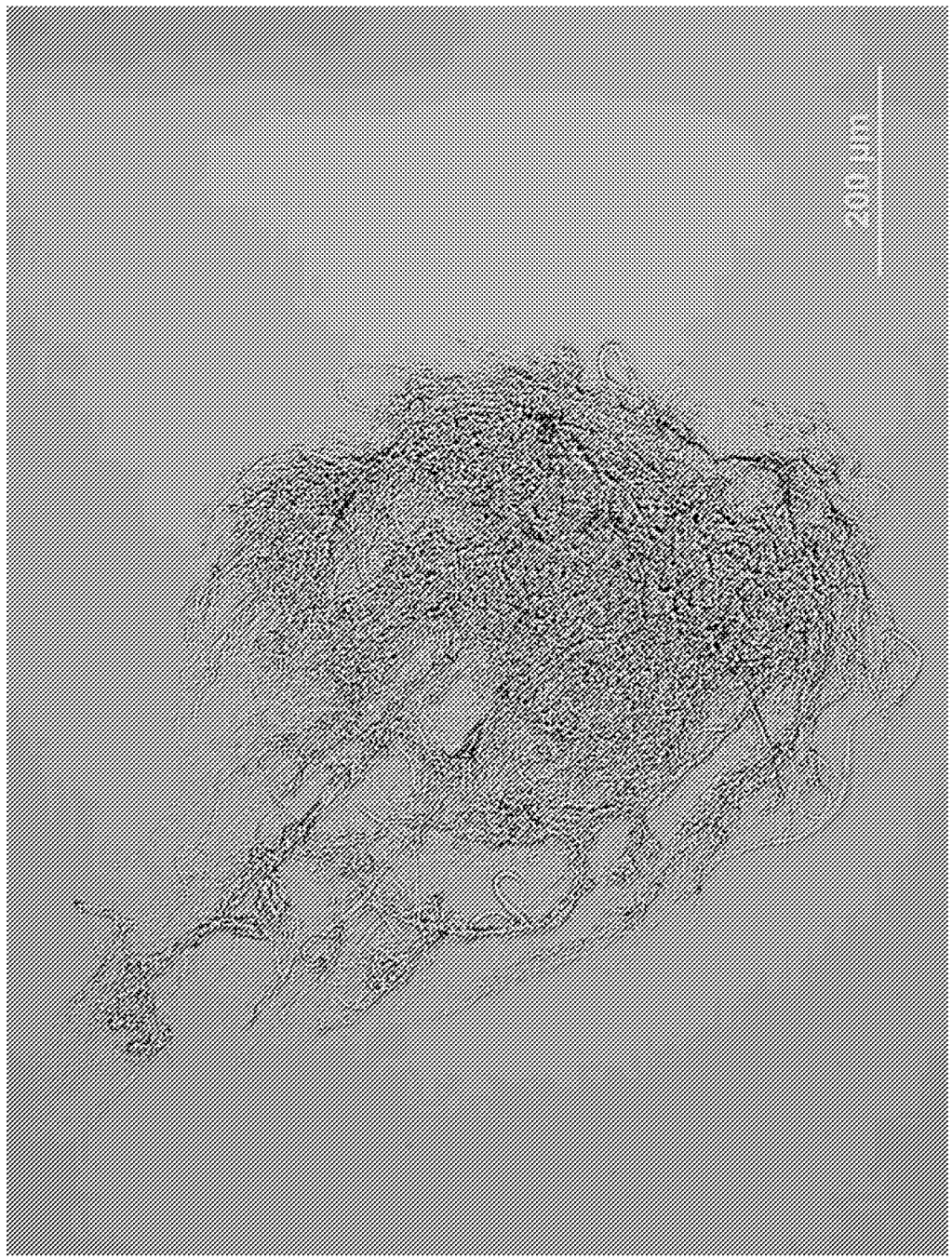
FIG. 12 is a microscope image of a single fractal-like particle made from sodium alginate.
Figure 13:
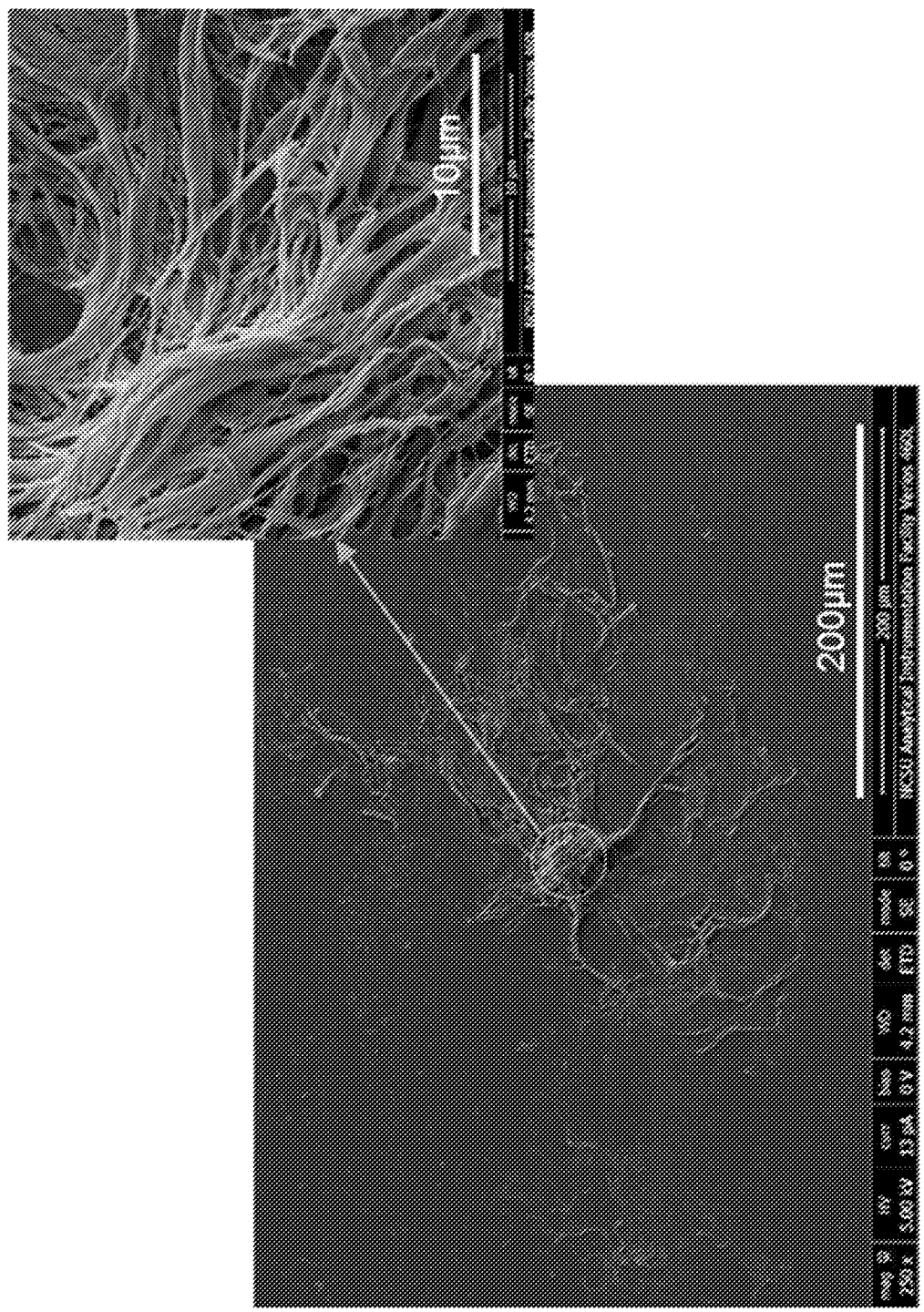
FIG. 13 is a scanning electron microscope image at two length scales of a fractal-like particle made from ethyl cellulose.
Figure 14:
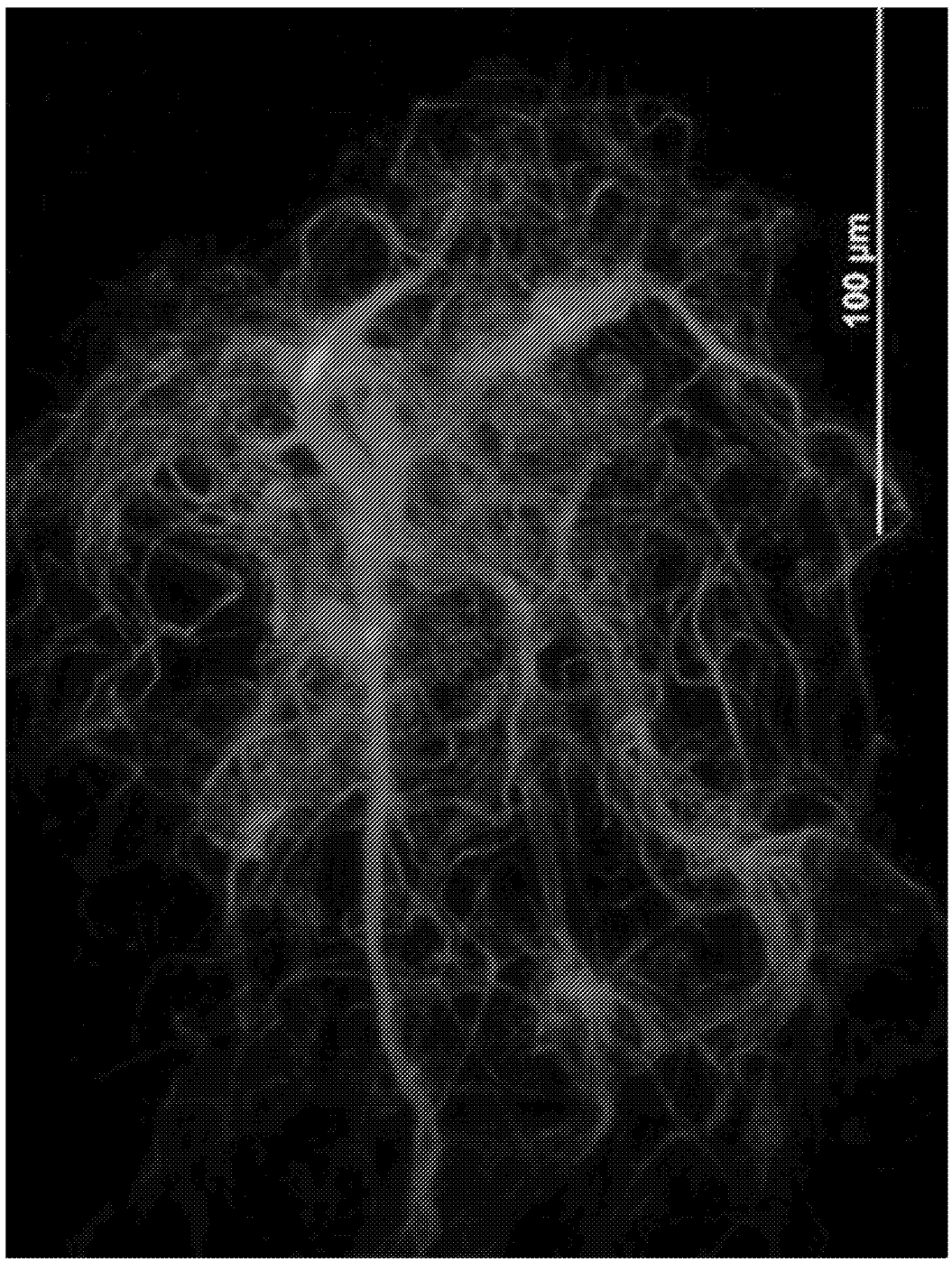
FIG. 14 is a microscope optical image of fractal-like particles made from cellulose acetate.
Figure 15:
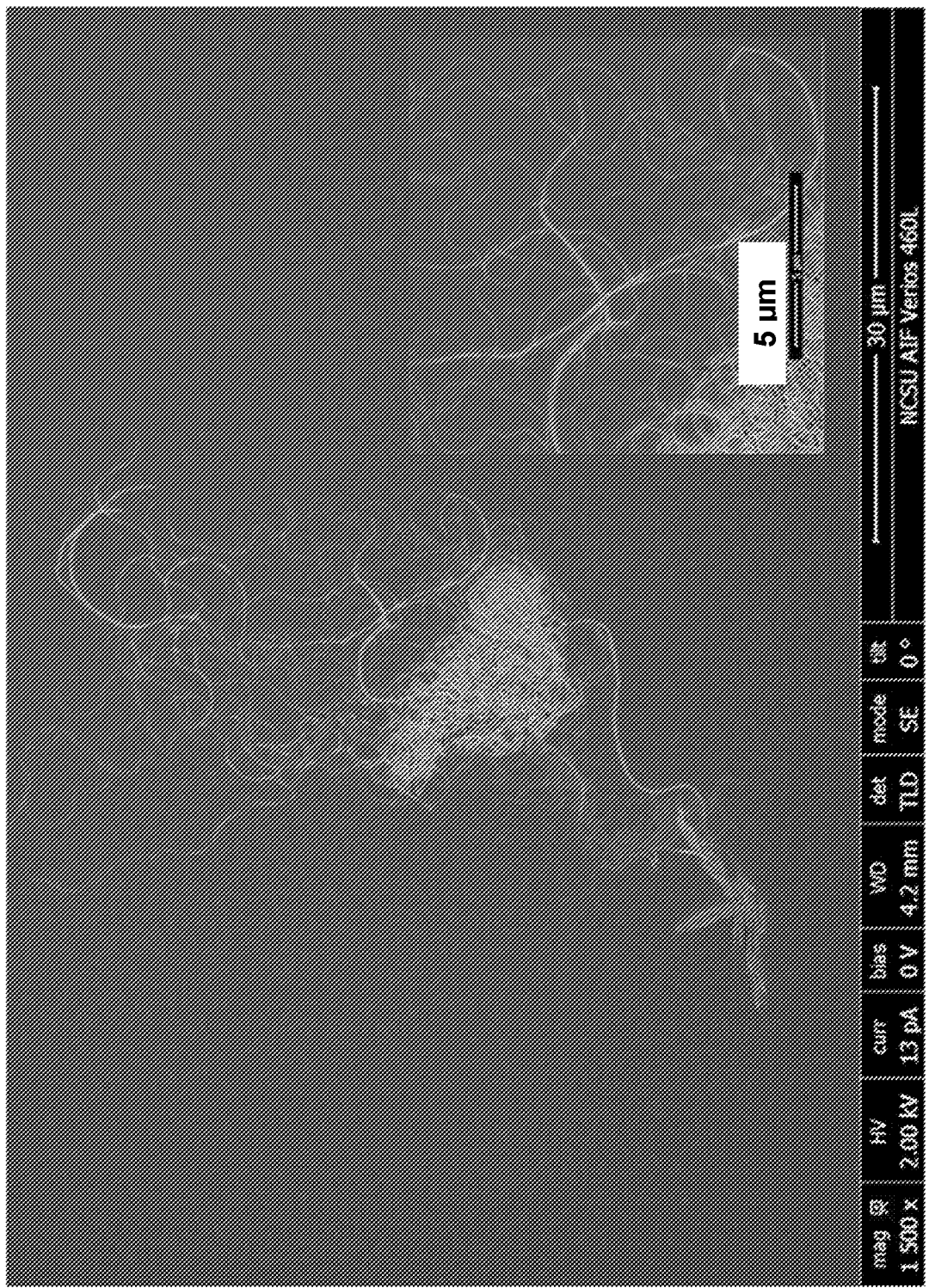
FIG. 15 is scanning electron microscope images of fractal-like particles made from cellulose acetate.
Figure 16:
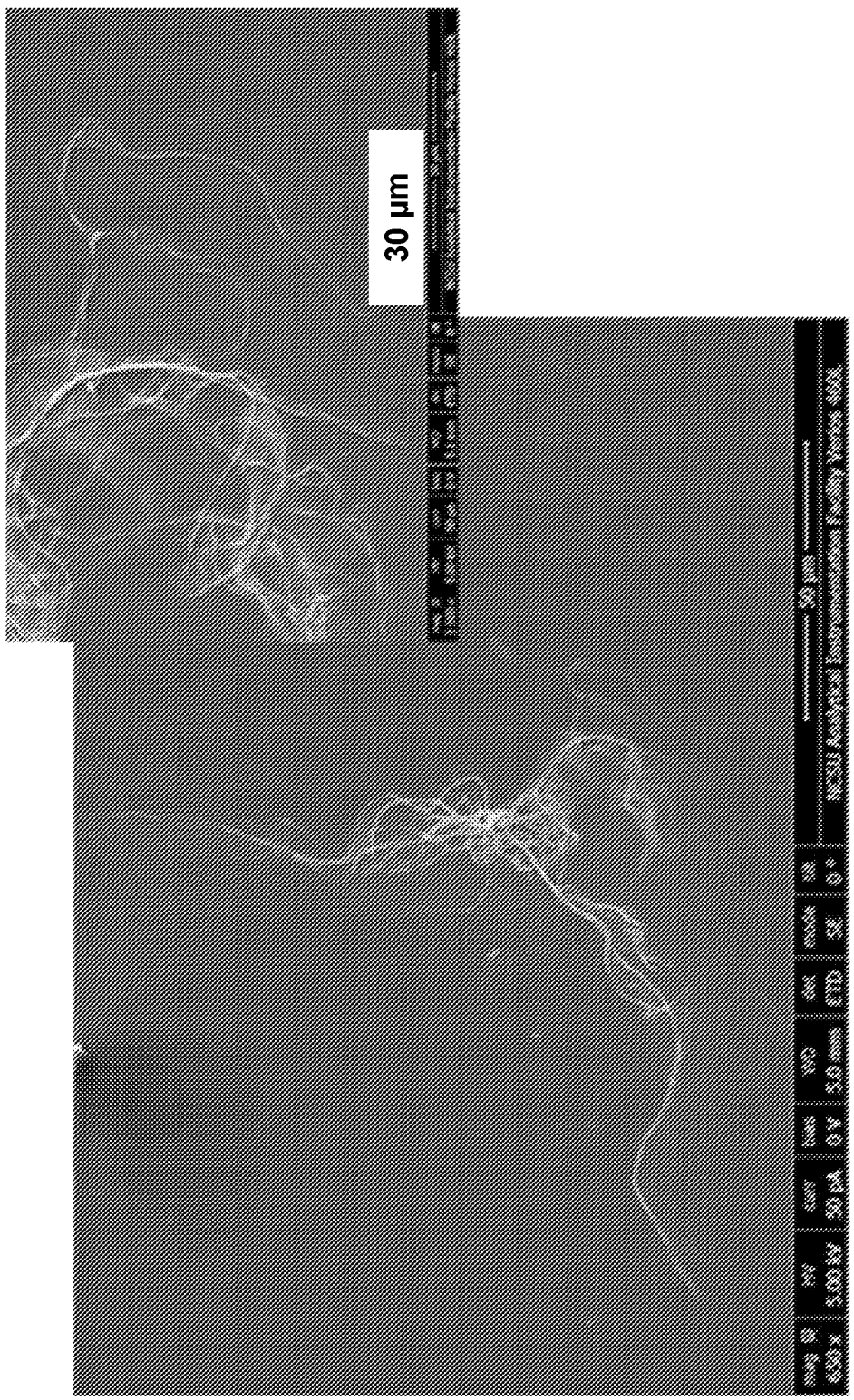
FIG. 16 is scanning electron microscope images of fractal-like particles made from polyvinyl alcohol.
Figure 17:
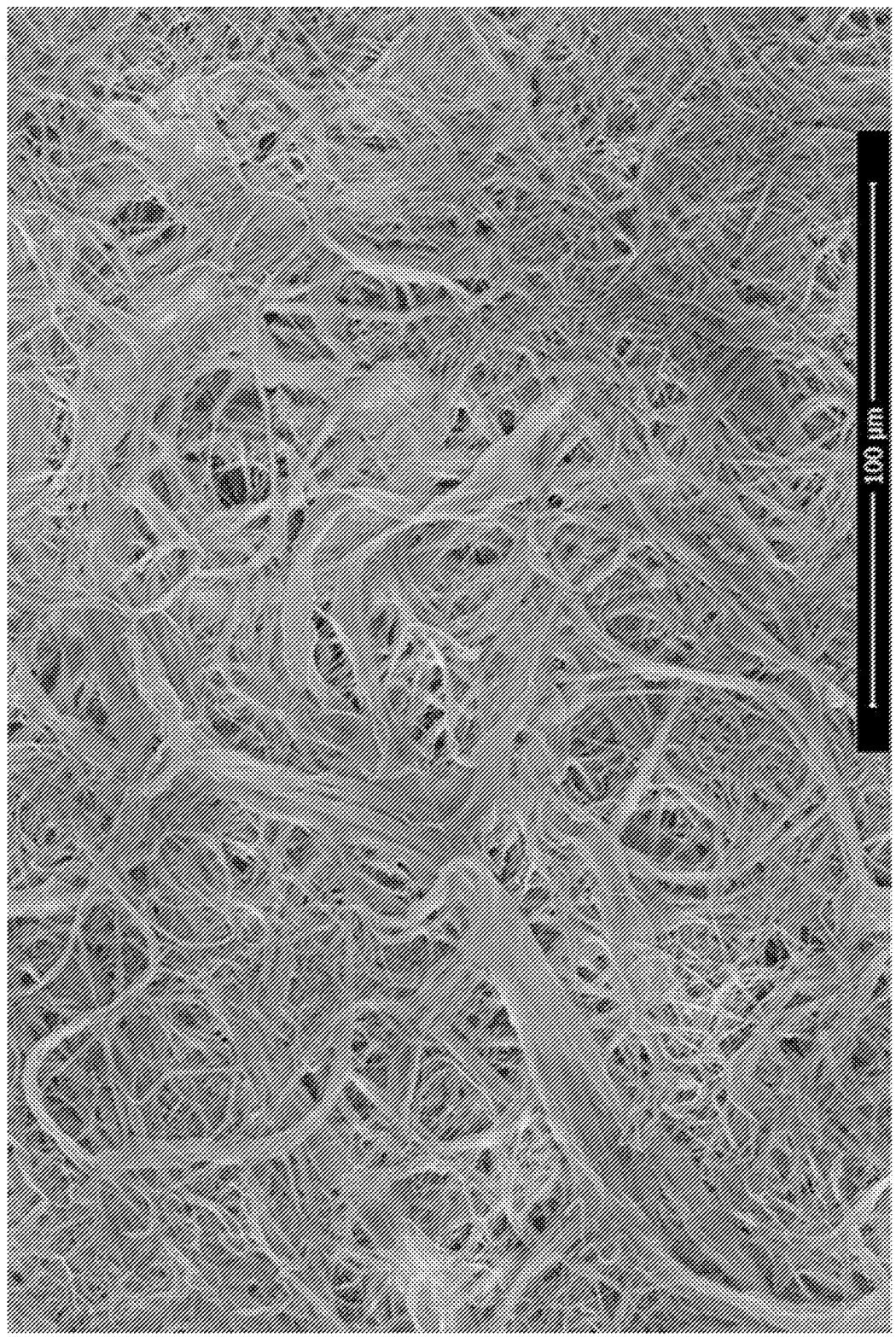
FIG. 17 is a scanning electron microscope image of a nonwoven coating prepared from polystyrene fractal-like particles.
Figure 18:
FIG. 18 is a photograph of a water droplet on a nonwoven coating prepared from polystyrene fractal-like particles showing the super hydrophobicity of the coating.

One application of the disclosed fractal-like particles is in the making of superhydrophobic surfaces having water contact angles higher than 150°. Superhydrophobic surfaces were generated by an evaporation process of a fractal-like particle suspension (FIG. 9). Approximately 2 wt. % fractal-like particles were dispersed in ethanol using a magnetic stir bar. The solution was poured into a PS disposable Petri dish and placed in an oven at 65° C. After evaporation, approximately 40 µL of water was deposited on top of the coating and its contact angle was measured with a goniometer (each set of tests were repeated 2 times on the different spots of the sample). FIGS. 9 (b) and (c) shows optical microscopic images of the fractal-like particle coated surfaces. As shown in FIG. 9 (c), fractal-like particles were entangled with each other forming porous structures. In addition, FIG. 17 and FIG. 18 show an SEM image and a demonstration of the resultant hydrophobicity, respectively, of a PS nonwoven.

Figure 19:
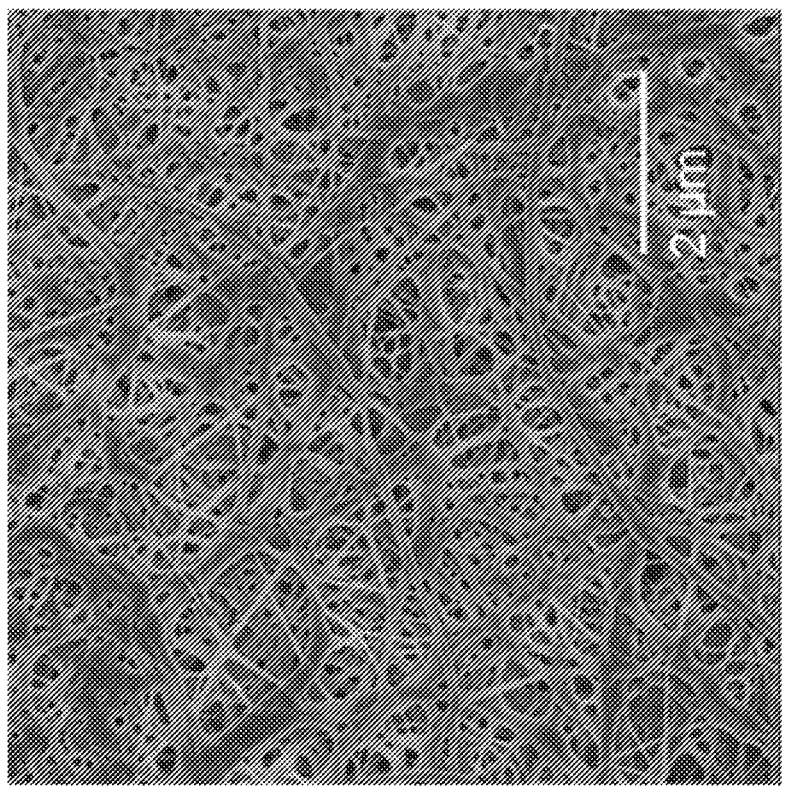
FIG. 19 is a pair of scanning electron microscope images of a nonwoven coating prepared from cellulose acetate fractal-like particles.
Figure 19:
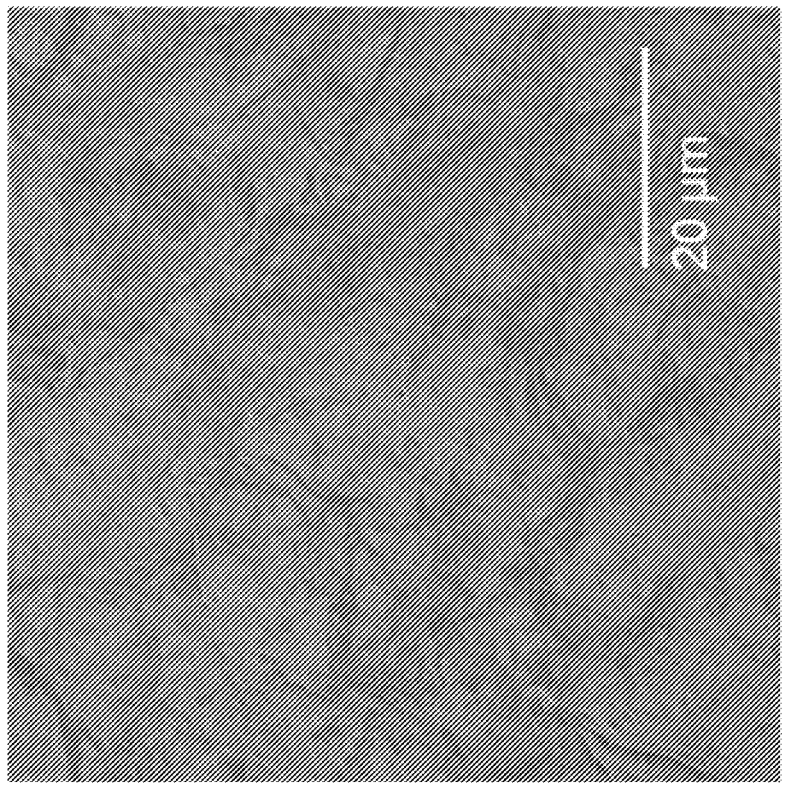
Figure 20:
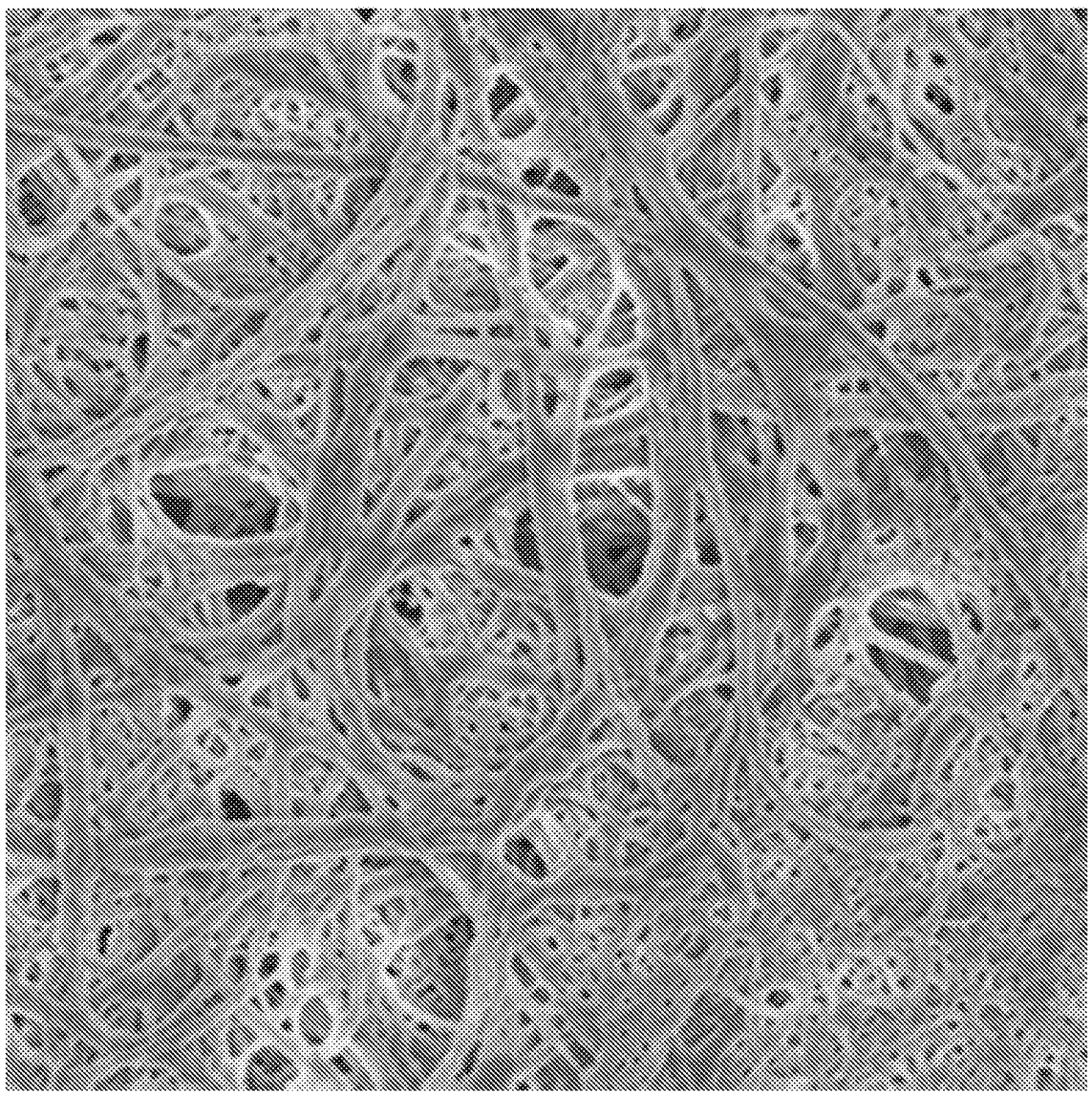
FIG. 20 is a scanning electron microscope image of a nonwoven coating prepared from polyvinyl alcohol fractal-like particles.
Figure 21:
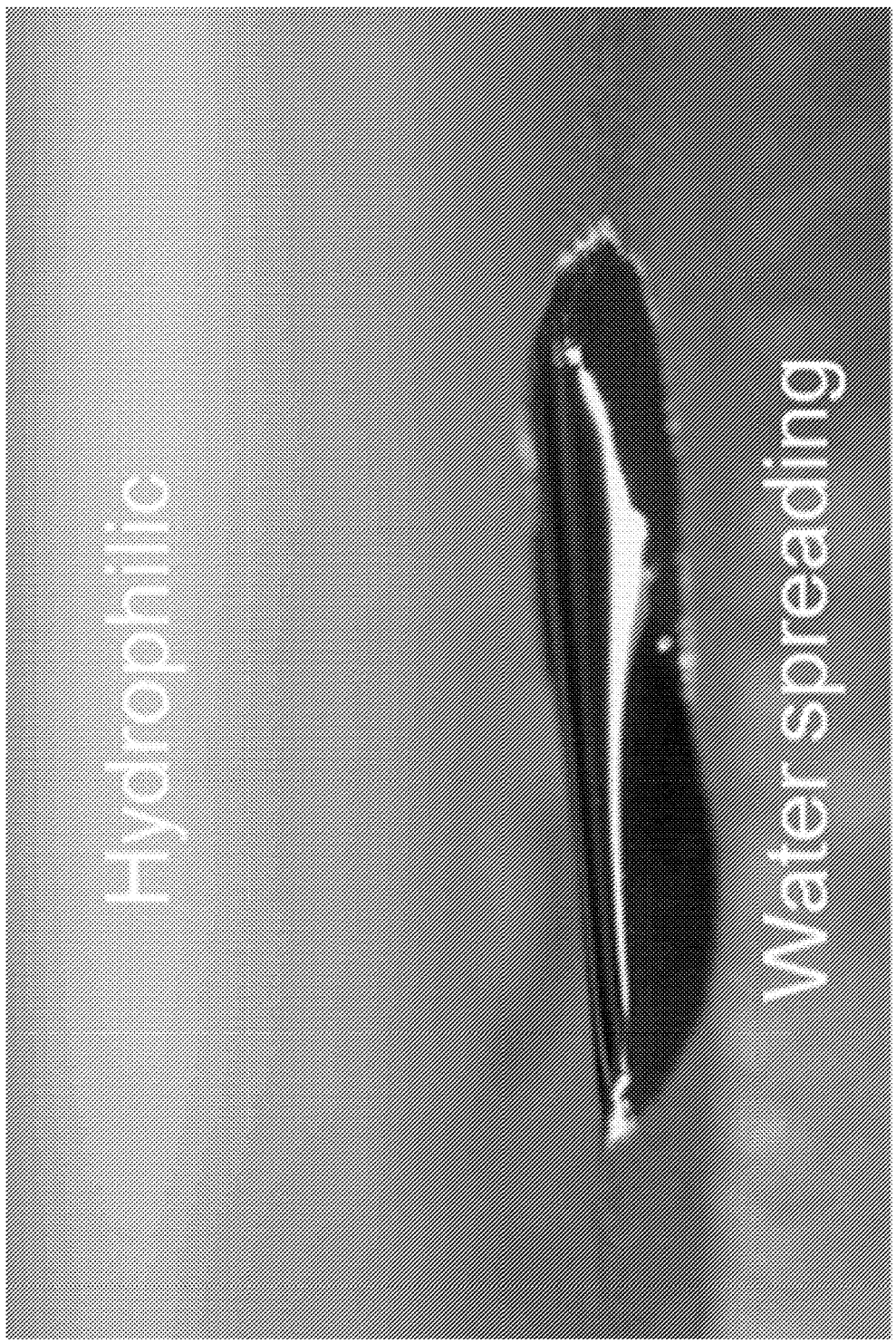
FIG. 21 is a photograph of water on a nonwoven coating prepared from polyvinyl alcohol fractal-like particles showing the hydrophilicity of the coating.
Figure 22:
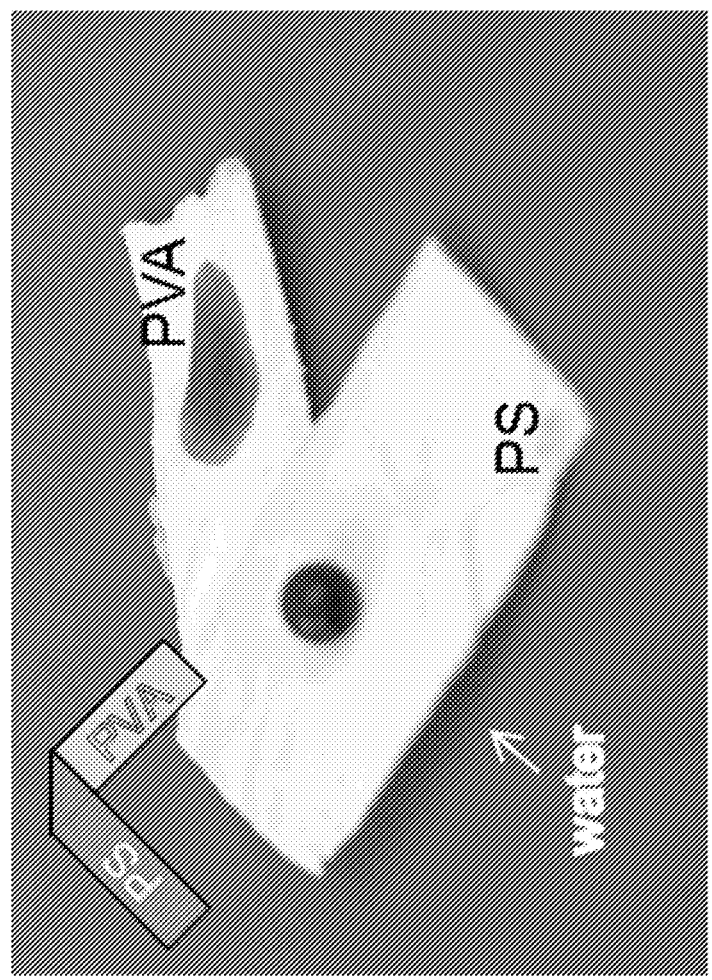
FIG. 22 is a schematic and a photograph showing a nonwoven sheet of material that is a Janus nonwoven, wherein one side is a nonwoven layer prepared from polystyrene fractal-like particles and the opposing side is a nonwoven layer prepared from polyvinyl alcohol fractal-like particles.
Figure 22:
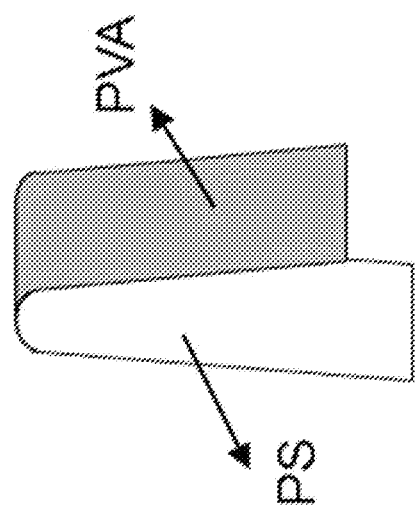

Other nonwoven particle coatings made from varying polymers are demonstrated in FIGS. 19 and 20. Of these coatings, the nonwoven made from polyvinyl alcohol fractal-like particles demonstrated a hydrophilic surface (FIG. 21). In addition, a coating composition comprising both a hydrophobic side and a hydrophilic side is demonstrated in FIG. 22. This type of coating is a Janus-type coating.

Figure 23:
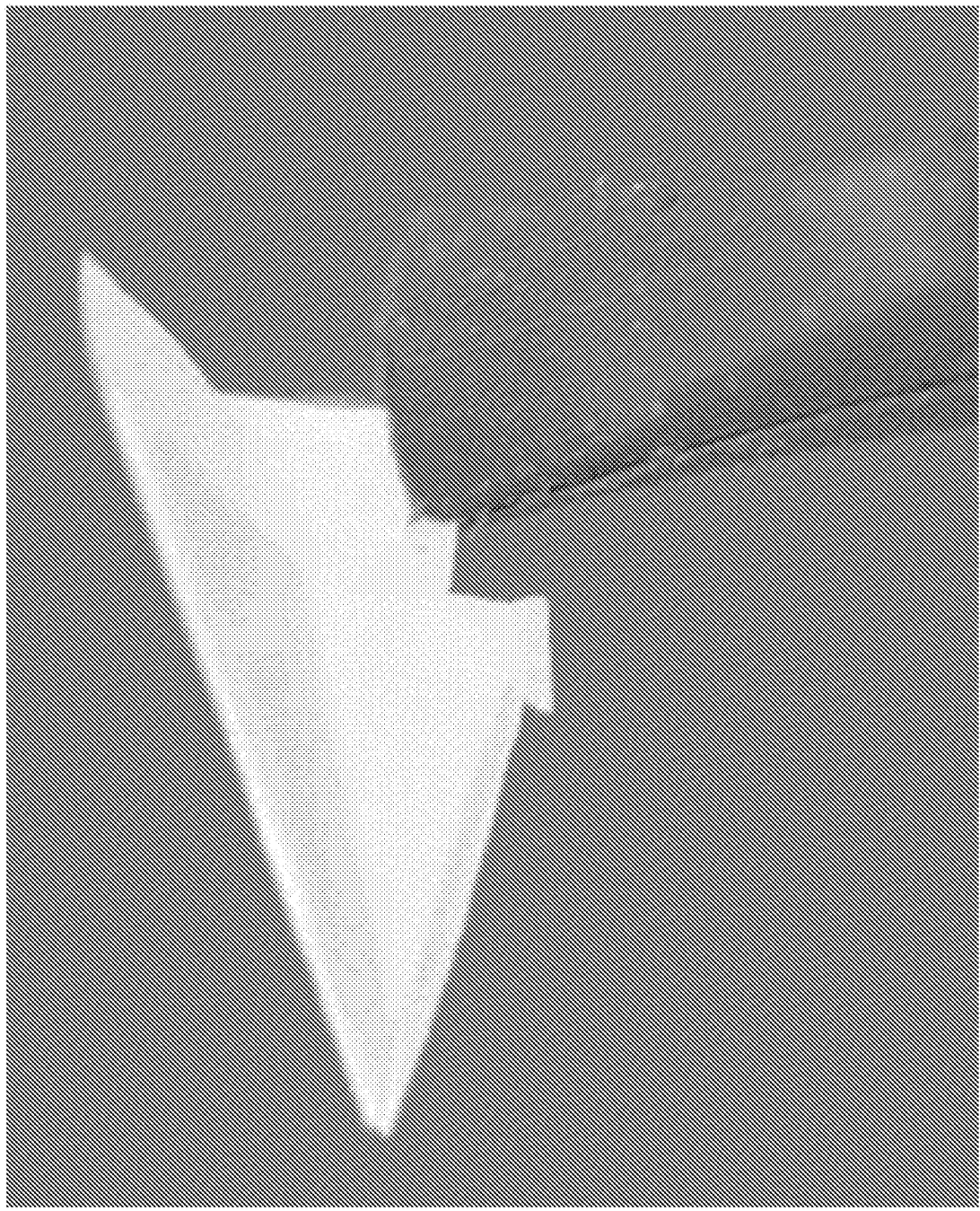
FIG. 23 is a scanning electron microscope image of a small origami including cellulose acetate fractal-like particles nonwoven film, illustrating the excellent mechanical properties of the material.

Fractal-like particles could also be easily dried on top of a fluorinated surface and peeled off to form strong free-standing nonwoven films with multiscale fibrous structure. These nonwoven films from FLPs can be made from a broad range of polymers. These nonwovens may be highly cohesive and have superior mechanical properties, e.g., cohesiveness, adhesivity, surface/volume ratio, and filtration efficiency. An example of folded nonwoven made of cellulose acetate FLPs can be seen in FIG. 23.

Figure 24:
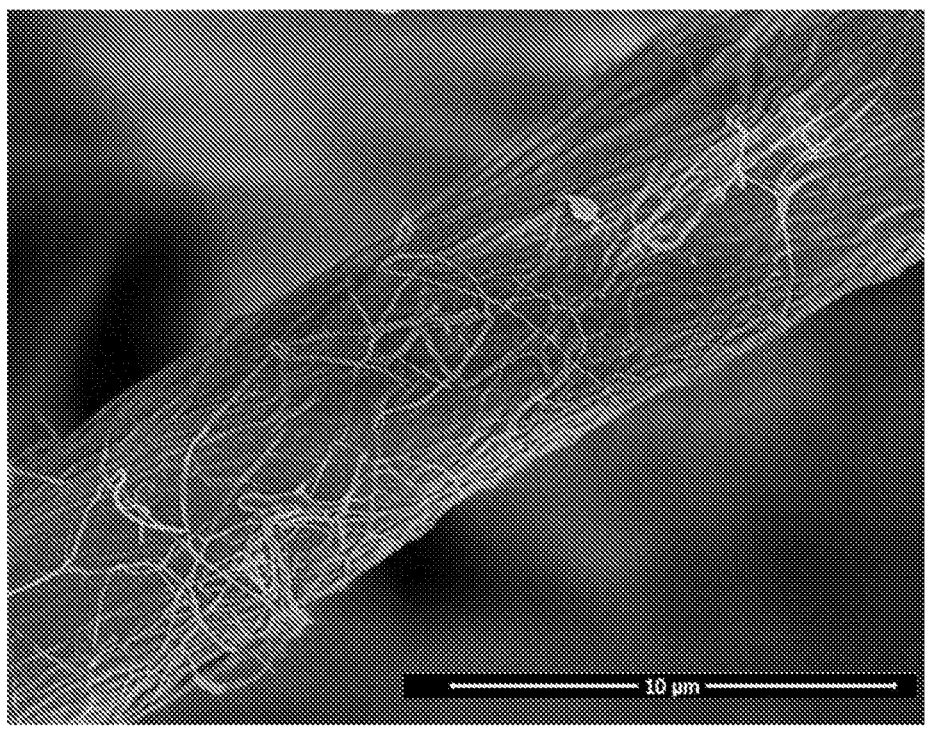
FIG. 24 is scanning electron microscope images of cellulose acetate fractal-like particles that wrap around a single cotton fiber, which can lead to strong adhesion.
Figure 24:
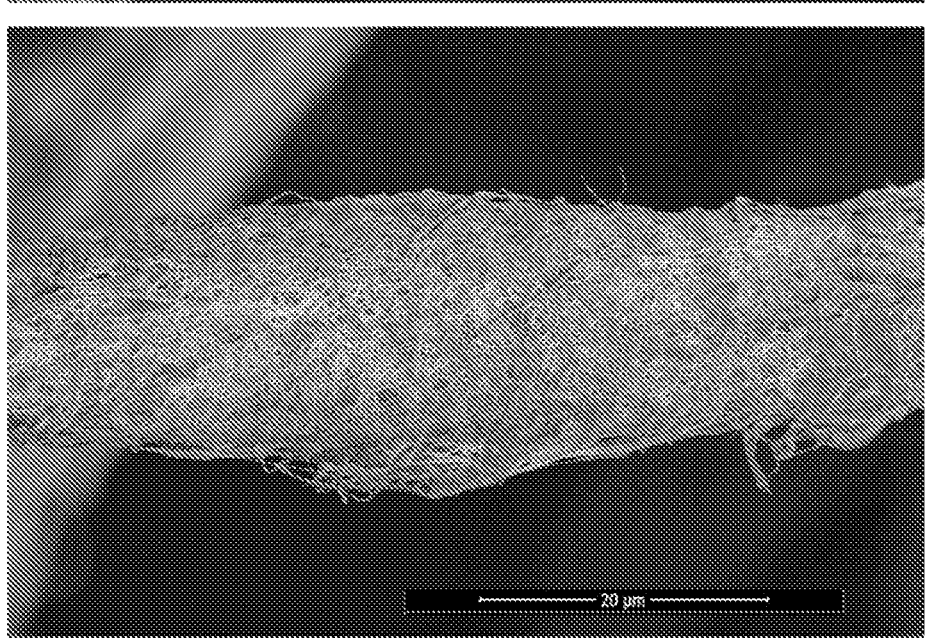

Cellulose acetate FLPs wrapped around a single cotton fiber are shown in FIG. 24. When a cotton textile is subjected to simple infusion with FLPs in suspension, the FLPs adhere and wrap around the cotton fiber cores (FIG. 24 (a)). They can also form porous "nanosheaths" around the fibers (FIG. 24 (b)). The FLPs thus make strongly adhesive coatings which dramatically modify the textile wetting, wicking, mechanical and tribological properties. These results prove that the FLPs could form the basis of highly efficient textile treatments with unique capabilities.

Example 3: Adhesion Analysis of Particle Coating Via Peel Off Test

Figure 26:
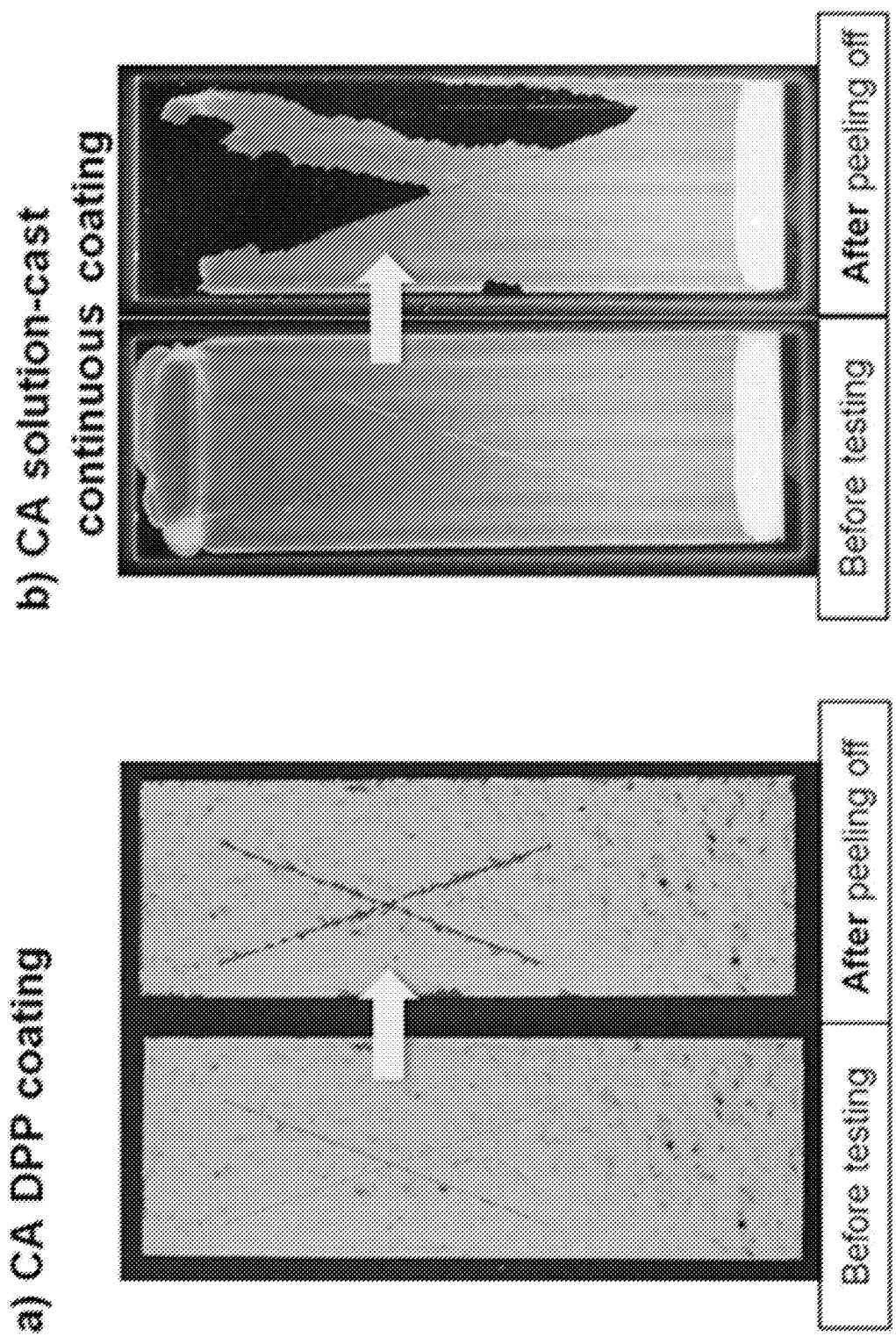
FIG. 26 is a series of photographs showing a comparison of the peel-off resistance (measured by ASTM D3359 testing) of coatings from fractal-like particles and continuous spun-cast cellulose acetate film: a) The fractal-like particle coatings remained completely intact, while b) the continuous spin-cast coatings from the same polymer peeled off.
Figure 27:
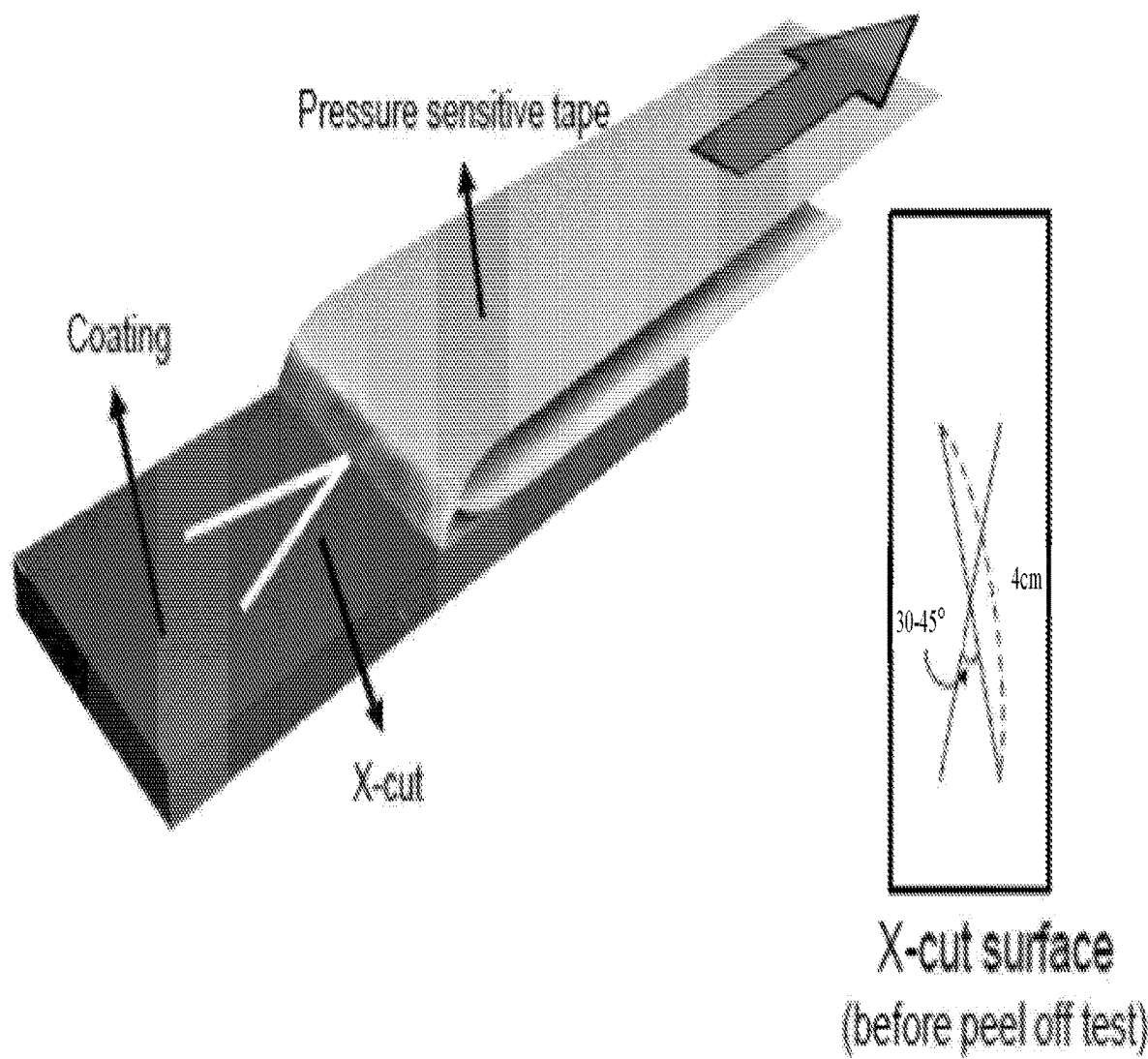
FIG. 27 is a schematic depicting the ASTM D3359 Type A (peel-off resistance test).

Coatings comprising fractal-like particles were analyzed for coating adhesion via the ASTM D3359 Type A test (FIG. 27), which is a standardized industrial adhesion test known within the art. It was found that the adhesion of fractal-like polymer particle films is significantly stronger than continuous cellulose acetate (CA) polymer film deposited by solution casting. Fractal-like CA particle coatings remained intact, while continuous films from the same polymer peeled off (FIG. 26). This is a surprising result demonstrating very unusual and potentially useful properties. In another round of experiments, it was found that the cellulose acetate fractal-like particle films exhibit very strong adhesion to PDMS substrates, which have very low surface energy (19 mJ/m$^2$). Without being bound by a particular theory, it is hypothesized that the strong adhesion of the disclosed coatings comes from a contact splitting effect (e.g., "Gecko skin adhesion") of the particles via the nanofiber branches that extend the furthest out from the particle.

Example 4: Adhesion Analysis of Particle Coating Via Lap Shear Test

The quantitative evaluation of dendrimeric particles as part of a coating was further analyzed through a lap shear test (similar to ASTM D1002, which is an adhesion test known within the art). The test measures shear force when two partially-glued plates are separated at a specified rate (FIG. 28(a)). The experiment was performed with two glass plates glued via a coating of the dendrimeric particles. The adhesion coating was made by applying 500 µl of dendrimeric particles in an ethanol suspension (1 wt. %) and then applied on a glass substrate. The other substrate was then brought into contact and the liquid medium was evaporated. As illustrated in FIG. 28(b), $1 \times 10^6$ Pa is needed to detach the two substrates. This value corresponds to the coating area of 1 cm×1 cm can withstand approximately 10 kg of an object. The same test was also performed with spherical cellulose acetate particles. When the glass substrates were adhered by spherical particles, they were easily detached at a low shear stress. The result shows that the unique morphology of the dendrimeric particle contributes to their strong adhesion when applied as a coating, or as a potential adhesive.

Figure 29:
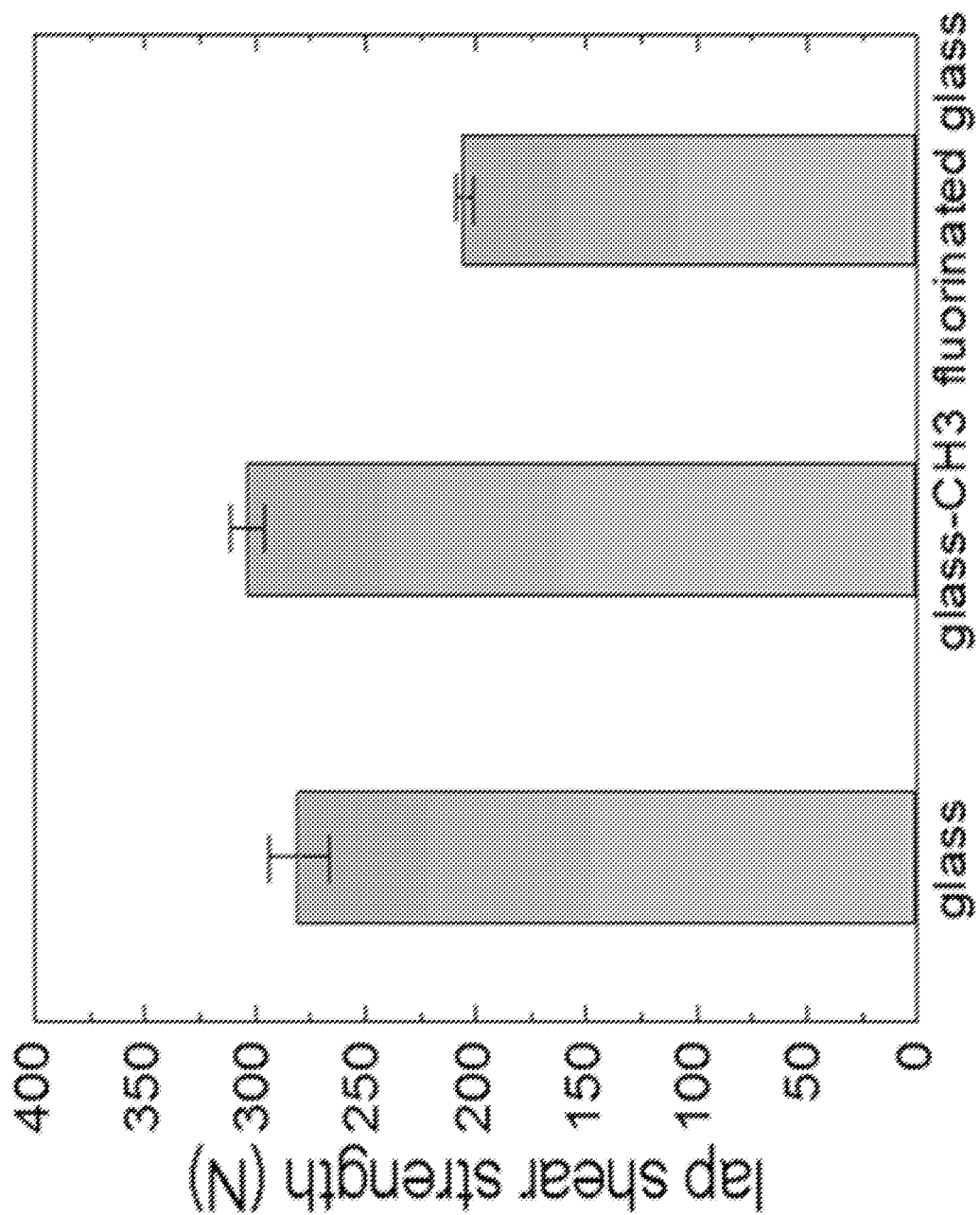
FIG. 29 is a graph showing the lap shear strength of cellulose acetate fractal-like particles on a glass slide and hydrophobized glass slides.

The quantitative evaluation of the origins of the adhesion of the dendrimeric particles as part of a coating was further performed by changing the hydrophobicity of the glass substrates. The hydrophobization of glass substrates was achieved by modifying the surface with hydrophobic silane coupling agents, dichlorodimethylsilane (methylsilane) and 1H,1H,2H,2H-perfluorooctyltriethoxysilane (fluorosilane). Upon hydrophobization, the apparent changes in the contact angles of water on the slide glasses went from 34.4° to 61.4° (methylsilane) and to 105.4° (fluorosilane). The CA FLPs were applied between the glass slides and the lap shear strength were measured (see FIG. 29). When the glass was hydrophobized with methylsilane the lap shear strength was slightly increased and slight decrease in lap shear strength with fluorosilane. There was not a significant difference in lap shear strength between bare glass and hydrophobized glasses. Therefore, this result implies that the adhesion results from van der Waals interaction Example 5: Use of Particles as Viscosity Modifiers The rheological properties of fractal-like particles in suspension were shown to be unique. The apparent volume of these fractal clusters is much higher than the actual content of fumed silica. The rheological behaviors of fractal-like particles and fumed silica suspensions were characterized using AR 2000 rheometer (TA instruments, USA) with cone and plate geometry (40 mm diameter and 55 µm gap size). They were compared to fumed silica, a common product that is effective as thickening and thixotropic agent in a low molecular weight solvent, and frequently used for commercial purposes. The fumed silica aggregates are flocculated by hydrogen bonding into fractal-like structures.

Figure 5:
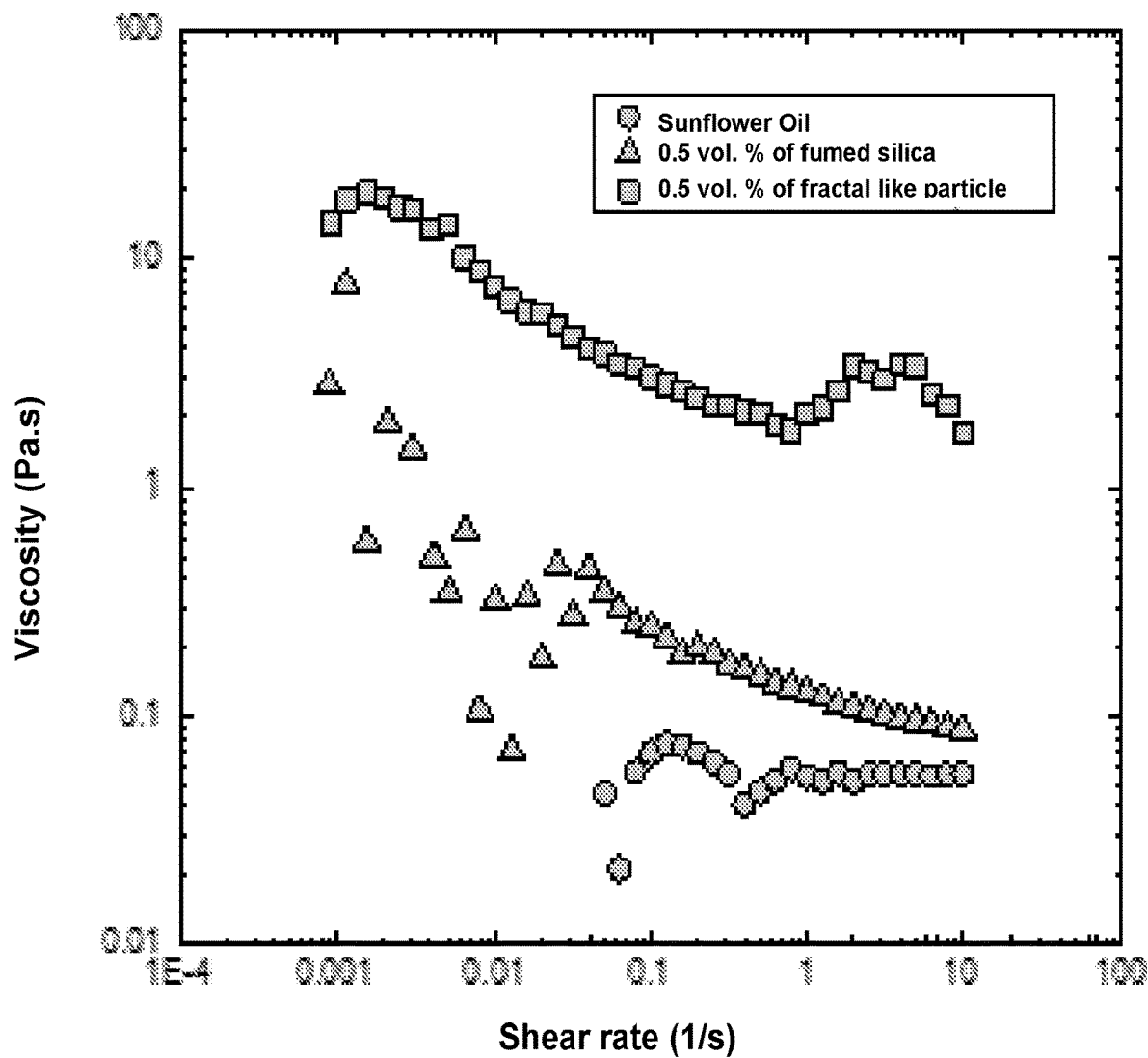
FIG. 5 is a graph showing rheological characteristics of a suspension of fractal-like particles at 0.5 vol. % in sunflower oil.
Figure 6:
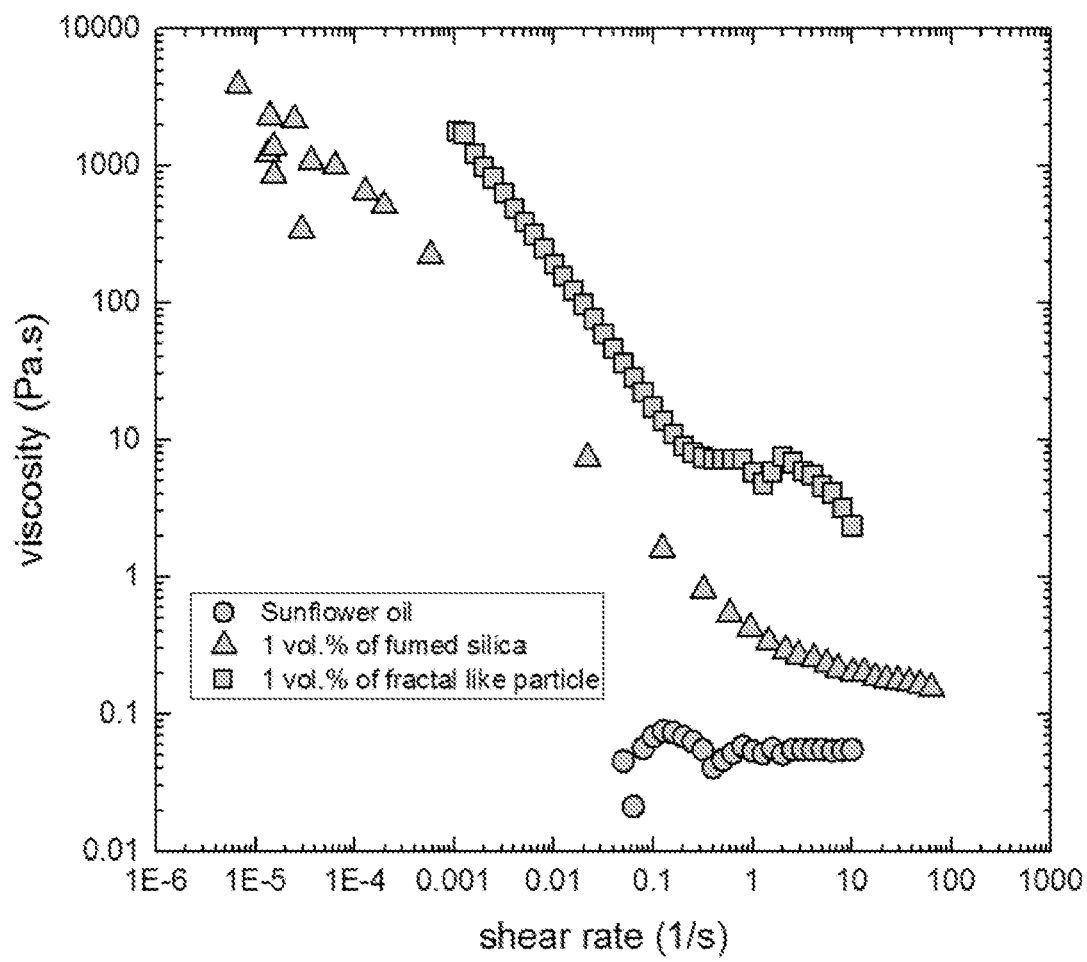
FIG. 6 is a graph showing rheological characteristics of a suspension of fractal-like particles at 1 vol. % in sunflower oil.

The shear stress—shear rate behavior of the fractal-like particles and fumed silica suspended in sunflower oil were compared in FIGS. 5 and 6. Both samples were prepared with the same volume fraction. As shown in FIGS. 5 and 6, both fractal-like particles and fumed silica exhibited shear thinning behavior upon increase of the shear rate. The viscosity of suspensions is largely affected by the volume fraction of suspended fillers according to Einstein's equation of suspension viscosity. This distinctive rheological behavior is due to the strong intramolecular and intermolecular bonding of polystyrene molecules within the developed fractal-like particles. The fractal-structure can hold large amounts of stagnant liquid phase in their structure showing much higher apparent volume than their actual volume. Notably, the fractal-like particle suspensions showed approximately 10 times higher viscosity than that of fumed silica at the same volume fraction and shear rate. The results prove that fractal-like particles can be much more effective thickening agents than fumed silica.

Figure 7:
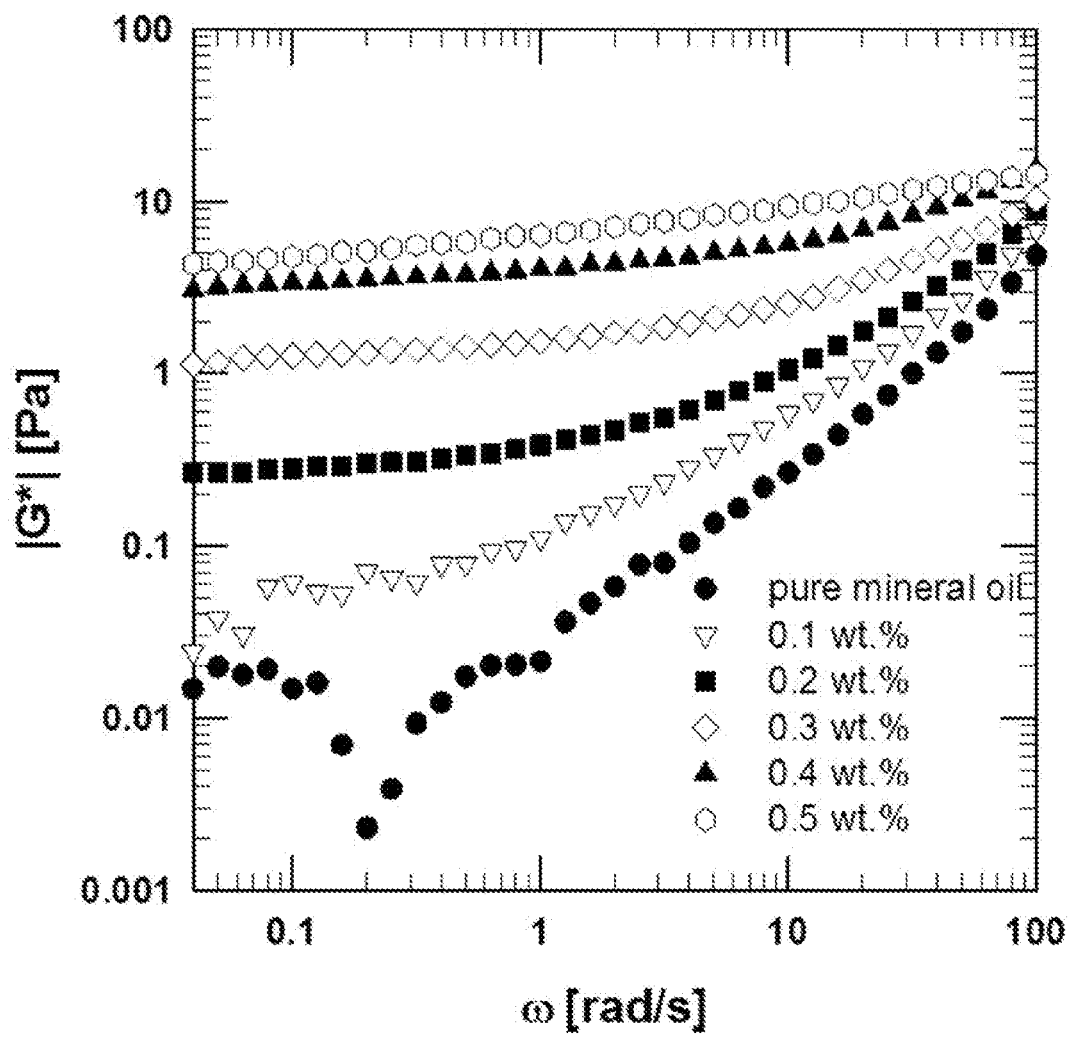
FIG. 7 is a graph showing rheological characteristics of a suspension of fractal-like particles as a function of wt. % in mineral oil.
Figure 8:
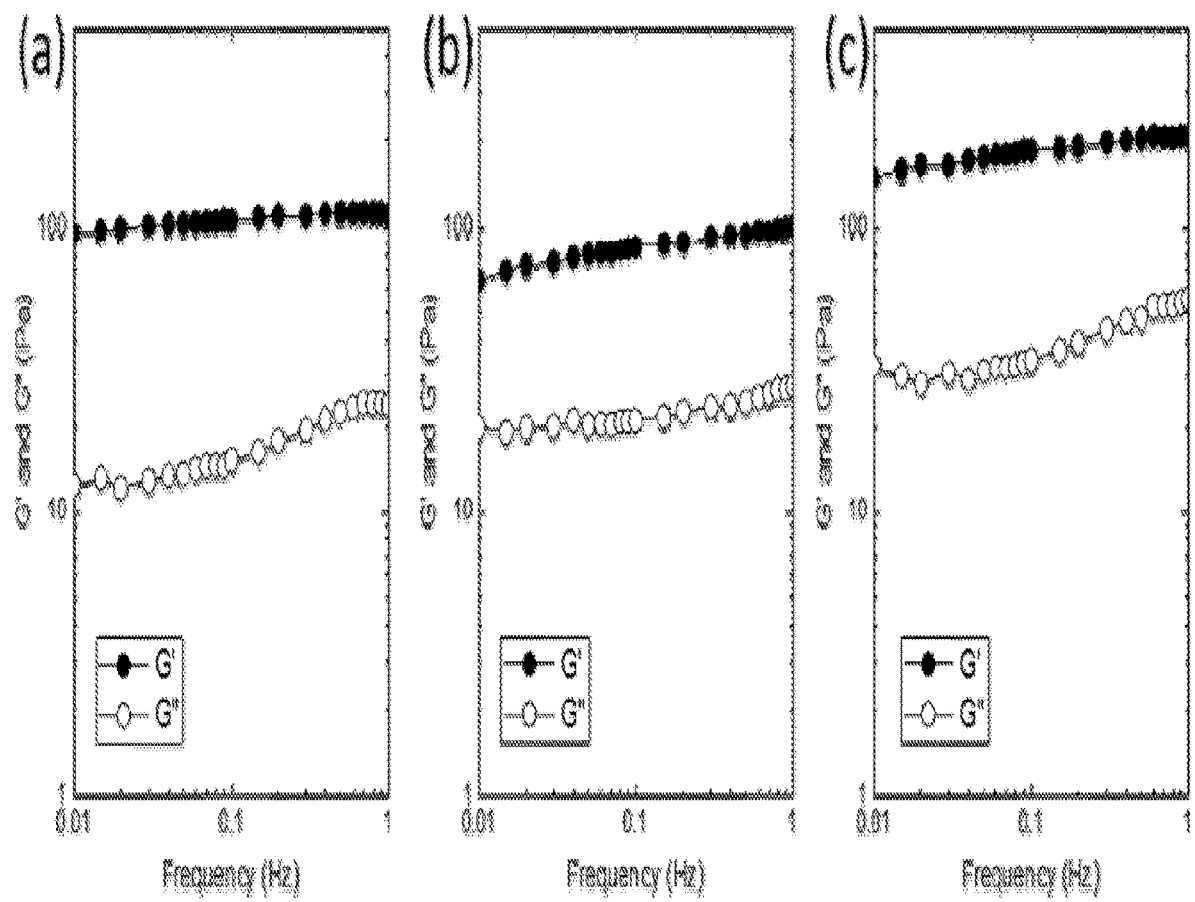
FIG. 8 is a graph showing rheological characteristics of a suspension of 0.5 vol. % cellulose acetate fractal-like particles in (a) mineral oil, (b) ethylene glycol, and (c) glycerol

A similar analysis of fractal-like particle was also assessed in mineral oil as a function of wt. % of the particles, as demonstrated in FIG. 7. In addition, FIG. 8 shows the G' and G" of 0.5 vol. % cellulose acetate (CA) FLP in (a) mineral oil, (b) ethylene glycol, and (c) glycerol by varying the frequency in the rheometer. The G' and G" of CA FLP does not have strong dependency on type of dispersion medium. This indicates that the fractal particles are effective as gelation agents for almost any medium.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A particle comprising an aggregate of polymer molecules, and having a branched fibrous structure that includes at least a first portion, a second portion and a third portion, each portion individually having a plurality of fibers wherein:
   the first portion comprises a first plurality of fibers having diameters of from about 10 times to about 100 times larger than the fiber diameters of the third portion, wherein the surface area of the first portion constitutes from about 10% to about 40% of the surface area of the particle;
   the second portion comprises a second plurality of fibers extending from the first portion having diameters of from about 5 times to about 10 times larger than the fiber diameters of the third portion, wherein the surface area of the second portion constitutes from about 20% to about 50% of the surface area of the particle; and
   the third portion comprises a third plurality of fibers extending from the second portion having diameters of from about 20 nm to about 500 nm, wherein the surface area of the third portion constitutes from about 10% to about 70% of the surface area of the particle.

2. The particle of claim 1, wherein:
   the first plurality of fibers have diameters from about 2 µm to about 10 µm; and
   the second plurality of fibers have diameters from about 0.5 µm to 2 µm.

3. The particle of claim 1, wherein the polymer is selected from the group consisting of cellulose-based polymers, polystyrene, polyvinyl alcohol, polyvinyl acetate, polysulfone, polyacrylate, polyacrylamide, polyester, polycarbonate, polyvinylidene fluoride, polyaniline, polyurethane, polylactic acid, polylactic-co-glycolic acid, sodium alginate, agarose, polyester, gelatin and combinations thereof.

4. The particle of any of claim 1, wherein the polymer is selected from the group consisting of cellulose acetate, ethyl cellulose, polystyrene, polyvinyl alcohol, poly sulfone, and combinations thereof.

5. The particle of claim 1, wherein the polymer has a molecular weight of from about 15,000 g/mol to 1,000,000 g/mol.

6. A viscosity modifier comprising the particle of claim 1.

7. A coating composition comprising the particle of claim 1.

8. The coating composition of claim 7, wherein the coating composition is super hydrophobic having a contact angle measurement for water of greater than 150°.

9. The coating composition of claim 7, wherein a first side of the coating composition is hydrophobic and a second side of the coating composition is hydrophilic, wherein the first and second sides are opposing sides.

10. The coating composition of claim 7, wherein the coating composition is repellent to liquids comprising hydrocarbon oil, alcohol, ester, fatty acids, vegetable oil, milk oil, animal oil or combinations thereof.

11. The coating composition of claim 7, wherein the coating composition has an adhesion strength of at least $2.5 \times 10^5$ Pa as measured by a lap shear test.

12. A fiber comprising the coating composition of claim 7.

13. A nonwoven material comprising the particle of claim 1.

14. A method for fabricating a particle comprising an aggregate of polymer molecules and having a branched fibrous structure, the method comprising:
   flowing a dispersion medium through a high shear mixer;
   introducing a precursor solution into the dispersion medium to form a dispersion system comprising the dispersion medium and a plurality of dispersed-phase components of the precursor solution, wherein the precursor solution comprises a polymer dissolved in a polymer solvent at a concentration of from about 3% to about 10% by weight, and the dispersion medium comprises an anti-solvent; and
   shearing the dispersed-phase components by flowing the dispersion system through the high shear mixer, wherein the dispersion system has a Reynolds number of about 3,000 or higher, whereupon the particle is formed in the dispersion medium wherein the particle comprises an aggregate of polymer molecules, and has a branched fibrous structure that includes at least a first portion, a second portion and a third portion, each portion individually having a plurality of fibers wherein:
   the first portion comprises a first plurality of fibers having diameters of from about 10 times to about 100 times larger than the fiber diameters of the third portion, wherein the surface area of the first portion constitutes from about 10% to about 40% of the surface area of the particle;
   the second portion comprises a second plurality of fibers extending from the first portion having diameters of from about 5 times to about 10 times larger than the fiber diameters of the third portion, wherein the surface area of the second portion constitutes from about 20% to about 50% of the surface area of the particle; and the third portion comprises a third plurality of fibers extending from the second portion having diameters of from about 20 nm to about 500 nm, wherein the surface area of the third portion constitutes from about 10% to about 70% of the surface area of the particle.

15. The method of claim 14, wherein the polymer is selected from the group consisting of cellulose-based polymers, polystyrene, polyvinyl alcohol, polyvinyl acetate, polysulfone, polyacrylate, polyacrylamide, polyester, polycarbonate, polyvinylidene fluoride, polyaniline, polyurethane, polylactic acid, polylactic-co-glycolic acid, sodium alginate, gelatin, agarose and combinations thereof.

16. The method of claim 14, wherein the polymer is cellulose acetate, ethyl cellulose, polystyrene, polyvinyl alcohol or poly sulfone.

17. The method of claim 14, wherein the polymer solvent is water, dimethylsulfoxide, dimethylformamide, dimethylacetamide, ethyl acetate, acetone, tetrahydrofuran, water, ketone, ether, ester, alcohol, aldehyde, hydrocarbon or combinations thereof.

18. The method of claim 14, wherein the polymer solvent is ethyl acetate, acetone or tetrahydrofuran.

19. The method of claim 14, wherein the anti-solvent is water, glycerol, alcohol or combinations thereof.

20. The method of claim 14, wherein the anti-solvent is water.

21. The method of claim 14, wherein the precursor solution is introduced at a volumetric flow rate ratio of at least 1/10 relative to the dispersion medium.

22. The method of claim 14, wherein the dispersion medium is flowed through the high shear mixer operating at least at 5,000 rpm.

23. The method of claim 14, wherein the particles are formed at a concentration of 5 g/L.

24. The method of claim 14, wherein the precursor solution is introduced into the dispersion medium in a direction selected from the group consisting of the same direction as the flow of the dispersion medium, the direction opposite to the flow of the dispersion medium, and a direction orthogonal to the flow of the dispersion medium.

25. The method of claim 14, wherein the polymer solvent and the anti-solvent have a solubility parameter difference of greater than 500 MPa.

26. A particle formed by the method of claim 14.

* * * * *